(12) United States Patent
Xiang et al.

(10) Patent No.: US 10,448,161 B2
(45) Date of Patent: Oct. 15, 2019

(54) SYSTEMS, METHODS, APPARATUS, AND COMPUTER-READABLE MEDIA FOR GESTURAL MANIPULATION OF A SOUND FIELD

(71) Applicant: QUALCOMM Incorporated, San Diego, CA (US)

(72) Inventors: Pei Xiang, San Diego, CA (US); Erik Visser, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 699 days.

(21) Appl. No.: 13/775,720

(22) Filed: Feb. 25, 2013

(65) Prior Publication Data

US 2013/0259238 A1   Oct. 3, 2013

Related U.S. Application Data

(60) Provisional application No. 61/619,202, filed on Apr. 2, 2012.

(51) Int. Cl.
| | |
|---|---|
| *H04R 5/04* | (2006.01) |
| *H04R 3/00* | (2006.01) |
| *H04S 7/00* | (2006.01) |
| *G06F 3/01* | (2006.01) |

(52) U.S. Cl.
CPC ............... *H04R 5/04* (2013.01); *G06F 3/017* (2013.01); *H04R 3/005* (2013.01); *H04S 7/303* (2013.01); *H04R 2203/12* (2013.01); *H04R 2430/20* (2013.01)

(58) Field of Classification Search
CPC ........................................................ H04R 5/04

USPC ............................................. 381/17, 18, 310
See application file for complete search history.

(56) References Cited

U.S. PATENT DOCUMENTS

| | | | |
|---|---|---|---|
| 2,636,943 A | 4/1953 | Schaeffer | |
| 4,133,977 A | 1/1979 | McGuire et al. | |
| 5,796,843 A | 8/1998 | Inanaga et al. | |
| 6,494,363 B1 | 12/2002 | Roger et al. | |
| 7,146,011 B2 | 12/2006 | Yang et al. | |
| 7,184,952 B2 | 2/2007 | Hillis et al. | |
| 7,194,094 B2 | 3/2007 | Horrall et al. | |
| 7,277,550 B1 | 10/2007 | Avendano et al. | |
| 7,298,871 B2 | 11/2007 | Lee et al. | |
| 7,505,898 B2 | 3/2009 | Hillis et al. | |
| 7,567,847 B2 | 7/2009 | Basson et al. | |
| 8,019,431 B2 | 9/2011 | Nie et al. | |
| 8,107,639 B2 | 1/2012 | Moeller et al. | |
| 8,140,326 B2 | 3/2012 | Chen et al. | |
| 2001/0021259 A1 | 9/2001 | Horrall | |
| 2002/0167862 A1 | 11/2002 | Tomasi et al. | |

(Continued)

FOREIGN PATENT DOCUMENTS

| | | |
|---|---|---|
| CN | 1347263 A | 5/2002 |
| CN | 102027440 A | 4/2011 |

(Continued)

OTHER PUBLICATIONS

U.S. Appl. No. 61/244,473, Grossinger et al.*

(Continued)

*Primary Examiner* — Sonia L Gay
(74) *Attorney, Agent, or Firm* — Austin Rapp

(57) ABSTRACT

Gesture-responsive modification of a generated sound field is described.

54 Claims, 34 Drawing Sheets loudspeaker LS10 loudspeaker LS20

(56) References Cited

U.S. PATENT DOCUMENTS

| | | | |
|---|---|---|---|
| 2003/0142833 | A1 | 7/2003 | Roy et al. |
| 2003/0144848 | A1 | 7/2003 | Roy et al. |
| 2004/0076271 | A1 | 4/2004 | Koistinen et al. |
| 2004/0125922 | A1 | 7/2004 | Specht |
| 2005/0065778 | A1 | 3/2005 | Mastrianni et al. |
| 2005/0132420 | A1 | 6/2005 | Howard et al. |
| 2006/0098830 | A1 | 5/2006 | Roeder et al. |
| 2006/0140420 | A1 | 6/2006 | Machida |
| 2006/0206221 | A1* | 9/2006 | Metcalf ............... G10H 1/0091 700/94 |
| 2006/0247919 | A1 | 11/2006 | Specht et al. |
| 2006/0277039 | A1 | 12/2006 | Vos et al. |
| 2007/0211023 | A1* | 9/2007 | Boillot .......................... 345/156 |
| 2007/0239295 | A1 | 10/2007 | Thompson et al. |
| 2007/0263889 | A1 | 11/2007 | Melanson |
| 2007/0269062 | A1* | 11/2007 | Rodigast et al. ............. 381/310 |
| 2008/0101616 | A1* | 5/2008 | Melchior et al. .............. 381/17 |
| 2008/0126086 | A1 | 5/2008 | Vos et al. |
| 2008/0235008 | A1 | 9/2008 | Ito et al. |
| 2009/0060236 | A1 | 3/2009 | Johnston et al. |
| 2009/0074199 | A1 | 3/2009 | Kierstein et al. |
| 2009/0195518 | A1 | 8/2009 | Mattice et al. |
| 2010/0098275 | A1 | 4/2010 | Metcalf |
| 2010/0158263 | A1 | 6/2010 | Katzer et al. |
| 2010/0182231 | A1 | 7/2010 | Morimiya et al. |
| 2010/0202656 | A1 | 8/2010 | Ramakrishnan et al. |
| 2010/0208912 | A1 | 8/2010 | Tohyama et al. |
| 2010/0226499 | A1 | 9/2010 | De et al. |
| 2010/0241999 | A1 | 9/2010 | Russ et al. |
| 2011/0038489 | A1 | 2/2011 | Visser et al. |
| 2011/0063442 | A1 | 3/2011 | Aarts et al. |
| 2011/0096941 | A1 | 4/2011 | Marzetta et al. |
| 2011/0103620 | A1* | 5/2011 | Strauss ..................... H04S 3/00 381/150 |
| 2011/0182438 | A1 | 7/2011 | Koike et al. |
| 2011/0242305 | A1* | 10/2011 | Peterson ............... G01S 15/003 348/77 |
| 2012/0014525 | A1* | 1/2012 | Ko .......................... H04S 7/302 381/17 |
| 2012/0020480 | A1 | 1/2012 | Visser et al. |
| 2012/0053931 | A1 | 3/2012 | Holzrichter |
| 2012/0194561 | A1* | 8/2012 | Grossinger ............. G06F 3/005 345/661 |
| 2012/0265534 | A1 | 10/2012 | Coorman et al. |
| 2013/0223658 | A1* | 8/2013 | Betlehem ................ H04S 3/002 381/307 |
| 2013/0259254 | A1 | 10/2013 | Xiang et al. |
| 2013/0315413 | A1 | 11/2013 | Yamakawa et al. |
| 2014/0006017 | A1 | 1/2014 | Sen |
| 2014/0086426 | A1 | 3/2014 | Yamakawa et al. |
| 2014/0328487 | A1 | 11/2014 | Hiroe |
| 2014/0337016 | A1* | 11/2014 | Herbig ...................... G06T 7/73 704/201 |

FOREIGN PATENT DOCUMENTS

| | | |
|---|---|---|
| JP | H05241573 A | 9/1993 |
| JP | 2008103851 A | 5/2008 |
| JP | 2010045432 A | 2/2010 |
| WO | WO-9948085 A1 | 9/1999 |
| WO | 2009156928 A1 | 12/2009 |
| WO | 2011036618 A2 | 3/2011 |
| WO | 2011135283 A2 | 11/2011 |
| WO | 2012015843 A1 | 2/2012 |

OTHER PUBLICATIONS

Acero A., "Audio and Video Research in Kinect," Microsoft Research, Jun. 2011, 58 pages.

Atlas L., et al. "Applications and Justification of Coherent Modulation Filtering", pp. 7, Accessed online Apr. 2, 2013 at www.siliconspeech.com/Media/TemporalDynamics/PDF/Atlas_TemporalDynamics.pdf.

Atlas L., et al., "Joint Acoustic and Modulation Frequency", EURASIP J. Appl. Sig, Proc, 2003, vol. 7, pp. 668-675.

Bergh M.V.D., et al., "Real-time 3D Hand Gesture Interaction with a Robot for Understanding Directions from Humans," IEEE, 2011, pp. 357-362.

Caputo M., et al., "3D Hand Gesture Recognition Based on Sensor Fusion of Commodity Hardware," in Proceedings of Mensch & Computer, 2012, pp. 293-302.

Doliotis P., et al., "Comparing Gesture Recognition Accuracy Using Color and Depth Information," PETRA '11 Proceedings of the 4th International Conference on Pervasive Technologies Related to Assistive Environments, 2011, pp. 1-7.

Drake A., "Kinect Hand Recognition and Tracking," Department of Computer Science & Engineering, 2012, 5 pages.

Du H., et al., "Hand Gesture Recognition Using Kinect," Dec. 15, 2011, Technical Report No. ECE-2011-04, pp. 1-23.

Elgendi M., et al., "Real-Time Speed Detection of Hand Gesture using Kinect", Workshop on Autonomous Social Robots and Virtual Humans, the 25th Annual Conference on Computer Animation and Social Agents (CASA 2012), Singapore; May 9-11, 2012, pp. 1-15.

Frati V., et al., "Using Kinect for hand tracking and rendering in wearable haptics," IEEE World Haptics Conference, 2011, pp. 317-321.

Guo J., "Hand Gesture Recognition and Interaction with 3D stereo Camera," Nov. 2011, 34 pages.

Hall J.C., "How to do Gesture Recognition with Kinect Using Hidden Markov Models (HMMs)," Dec. 22, 2011, Creative Distraction, 12 pages, [Retrieved on Oct. 24, 2012].

Hamlynkinect, "Hand Detection Algorithms," Retrieved on Oct. 31, 2012, 2 pages, <URL: http://hamlynkinect.wikispaces.com/Hand+Detection+Algorithms>.

International Search Report and Written Opinion—PCT/US2013/033082—ISA/EPO—dated Jun. 25, 2013.

Kawahara H., et al., "Restructuring speech representations using a pitch-adaptive time-frequency smoothing and an instantaneous-frequency-based F0 extraction: Possible role of a repetitive structure in sounds", Speech Comm, 1999, vol. 27, pp. 187-207.

Kurakin A., et al., "A Real Time System for Dynamic Hand Gesture Recognition With a Depth Sensor," 20th European Signal Processing Conference (EUSIPCO) 2012, pp. 1975-1979.

Li X., et al., "Harmonic Coherent Demodulation for Improving Sound Coding in Cochlear Implants", Acoustics Speech and Signal Processing (ICASSP), 2010, IEEE International Conference on, Mar. 14-19, 2010, pp. 5462-5465.

Li Y., "Hand Gesture Recognition Using Kinect," Aug. 2012, 44 pages.

Liu N., et al., "Gesture Classification Using Hidden Markov Models and Viterbi Path Counting," Proc. VIIth Digital Image Computing: Techniques and Applications, Dec. 10-12, 2003, pp. 273-282.

"Mahmoodzadeh A., et al., "Single channel speech separation in modulation frequency domain based on a novel pitch range estimation method", EURASIP J. Advances in Sig. Proc, 2012, vol. 67, pp. 10."

Mizoguchi, et al., "Invisible Messenger: Visually Steerable Sound Beam Forming System based on Face Tracking and Speaker Array," SICE Annual Conference in Fukui, Fukui University, Japan, Aug. 4-6, 2003, pp. 3007-3011.

Park S., et al., "3D hand tracking using Kalman filter in depth space," EURASIP Journal on Advances in Signal Processing, 2012, vol. 36, pp. 1-18, <URL: http://asp.eurasipjournals.com/content/2012/1/36>.

Rafaely, et al., "Optimal Model-Based Beamforming and Independent Steering for Spherical Loudspeaker Arrays," IEEE Transactions on audio, speech, and language processing, vol. 19. 19, No. 7, Sep. 2011, pp. 2234-2238.

Ren Z., et al., "Depth Camera Based Hand Gesture Recognition and its Applications in Human-Computer-Interaction," 8th International Conference on Information, Communications and Signal Processing (ICICS), 2011, pp. 1-5.

Ren Z., et al., "Robust Hand Gesture Recognition with Kinect Sensor," Proceedings of the 19th ACM international conference on Multimedia, 2011, pp. 759-760.

(56) References Cited

OTHER PUBLICATIONS

Schimmel S.M. et al., "Coherent Envelope Detector for Modulation Filtering of Speech", in Proceedings of ICASSP, vol. 1, pp. 221-224, Philadelphia, USA, May 2005.

Schimmel S.M., et al., "Feasibility of Single Channel Speaker Separation Based on Modulation Frequency Analysis", Acoustics, Speech and Signal Processing, 2007. ICASSP 2007. IEEE International Conference on, Apr. 15-20, 2007, pp. IV-605-IV-608.

Schimmel S.M., et al., "Frequency Reassignment for Coherent Modulation Filtering", Proceedings of ICASSP'06, 2006, pp. 261-264.

Schmeder, "An Exploration of Design Parameters for Human Interactive Systems with Compact Sphere Loudspeaker Arrays," Ambisonics Symposium, Jun. 2009, pp. 1-11.

Shi, et al., "Development of a Parametric Loudspeaker: A Novel Directional Sound Generation Technology," IEEE Potentials, Nov.-Dec. 2010, vol. 29 Issue 6, pp. 20-24.

Shimoda H., et al., "A Study on Real-time Gesture Classification Method," 2001, 5 pages.

Steinberg I., et al., "Hand Gesture Recognition in Images and Video," Irwin and Joan Jacobs Center for Communication and Information Technologies, CCIT Report #763, Mar. 2010, pp. 1-20.

Tang M., "Hand Gesture Recognition Using Microsoft's Kinect," Mar. 16, 2011, pp. 1-7.

Tang M., "Recognizing Hand Gestures with Microsoft's Kinect," 2011, pp. 1-5.

Trigo T.R., et al., "An Analysis of Features for Hand-Gesture Classification," IWSSIP 2010—17th International Conference on Systems, Signals and Image Processing, 2010, pp. 412-415.

Trindade P., et al., "Hand gesture recognition using color and depth images enhanced with hand angular pose data," 2012 IEEE International Conference on Multisensor Fusion and Integration for Intelligent Systems (MFI), Sep. 13-15, 2012, pp. 71-76.

Xu W., et al., "Gesture Recognition based on 2D and 3D Feature by using Kinect Device," 2012, pp. 77-79.

Yoo, S.: "Speech Decomposition and Enhancement," University of Pittsburgh, 2005, pp. 178, Section 1.1, p. 1-3, Section 2.1.2 p. 6, Section 2.2.3 p. 10-11, Fig.2, Section 3.2, Section 5.1.1, p. 88, Para.2, Section 6.1 p. 112 Para.2, Accessed online Apr. 2, 2013, <URL: http://d-scholarship.pitt.edu/8246/1/dissertation_Yoo.pdf>.

Zhang Z., "Human Body Language Understanding with 3D Sensors," 2011, 54 pages.

Do C.T., et al., "On the Recognition of Cochlear Implant-Like Spectrally Reduced Speech With MFCC and HMM-Based ASR", published by IEEE Transactions on Audio, Speech and Language Processing on Jul. 1, 2010 at IEEE Service Center, New York, NY, USA, XP011329165.

Langton C., "Signal Processing & Simulation Newsletter", 1999, 11 Pages, http://complextoreal.com/wpcontent/uploads/2013/01/tcomplex.pdf as of Apr. 1, 2015.

\* cited by examiner loudspeaker LS10, loudspeaker LS20, array RL110, array RL120

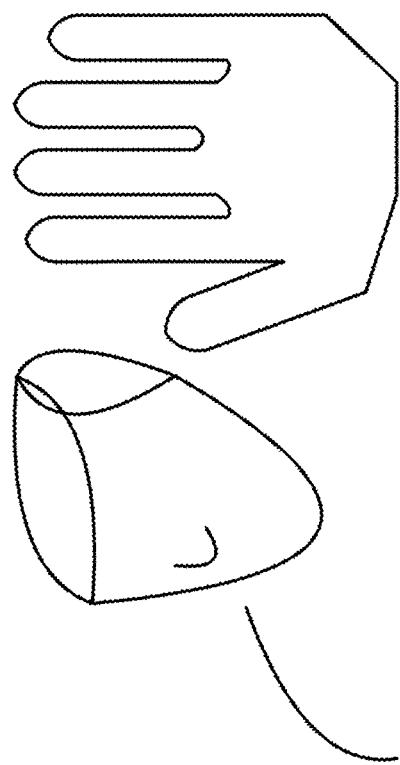
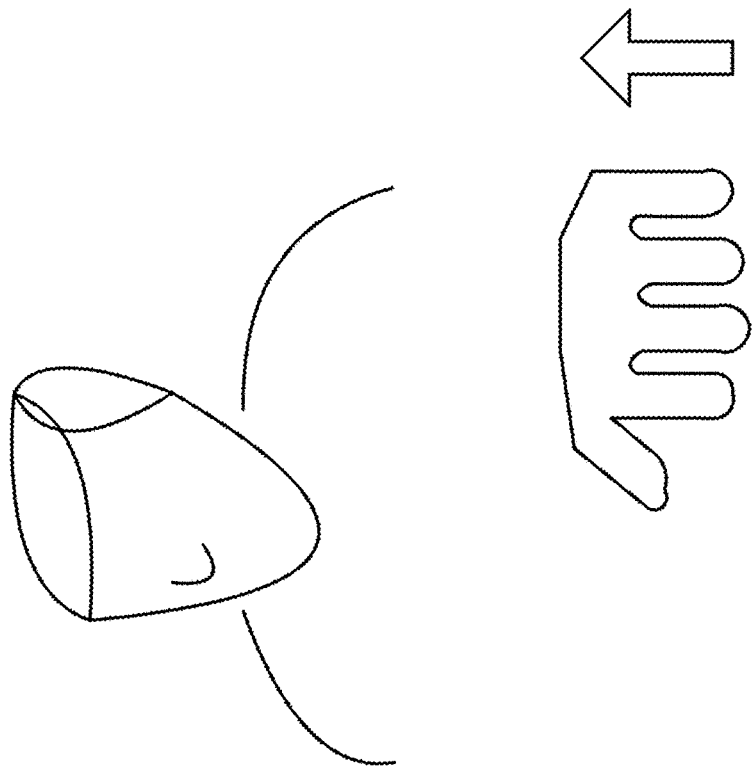
FIG. 2A
FIG. 2B

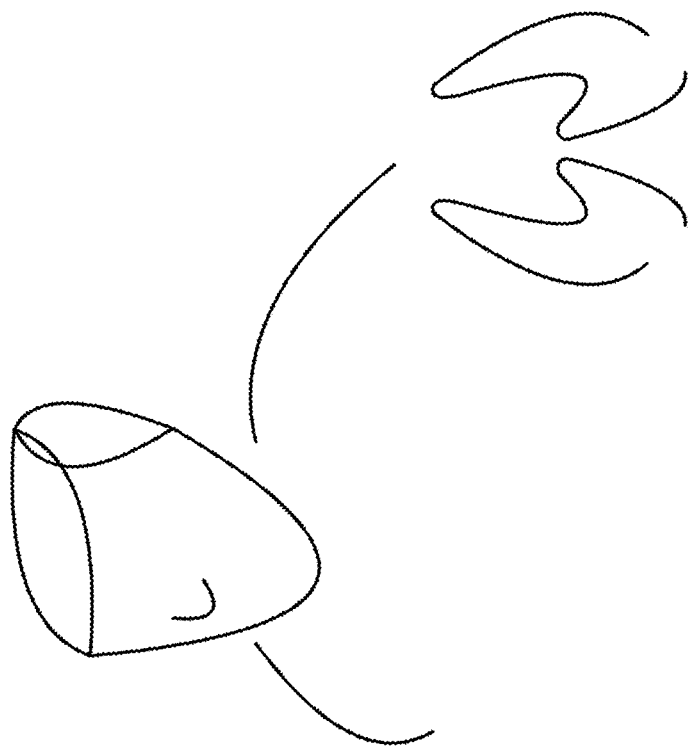
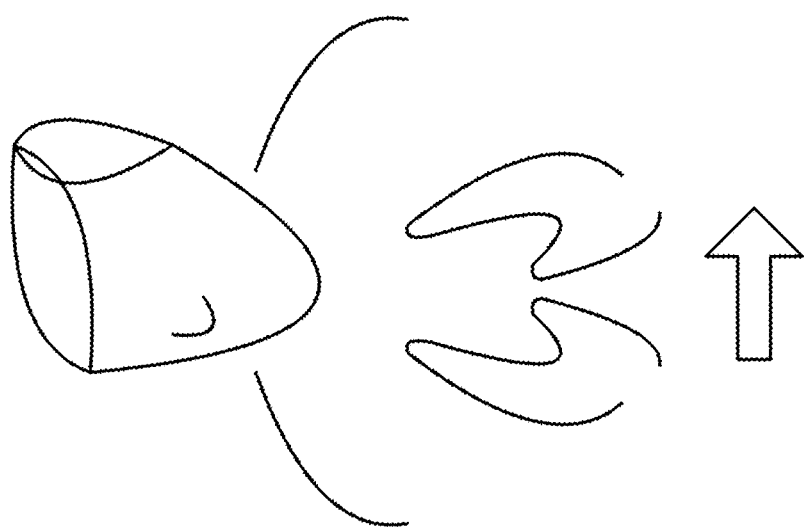

| REPRESENTED GESTURE | CORRESPONDING COMMAND |
|---|---|
| GA1) blocking | CA1) reduce beam intensity |
| GA2) beckoning | CA2) increase beam intensity |
| GB1) closing hand, translating, opening | CB1) change beam direction |
| GB2) bringing hands together, translating, moving hands apart | CB2) change beam direction |
| GC1) moving hands toward each other horizontally | CC1) reduce beam width |
| GC2) moving hands away from each other horizontally | CC2) increase beam width |
| GD1) raising hand to ear | CD1) create beam |
| GD2) hand-waving | CD2) delete beam |
| GE1) raising hands together | CE1) increase sound field intensity |
| GE2) lowering hands together | CE2) decrease sound field intensity |
| GF1) moving hands toward each other vertically | CF1) compress dynamic range (e.g., of field or beam) |
| GF2) moving hands away from each other vertically | CF2) expand dynamic range (e.g., of field or beam) |

FIG. 8

| REPRESENTED GESTURE | CORRESPONDING COMMAND |
|---|---|
| GF3) holding one hand to ear while lowering other hand | CF3) decrease beam intensity |
| GF4) holding one hand to ear while raising other hand | CF4) increase beam intensity |
| GG1a) holding one hand to ear while holding other open palm upright above chin level and rotating CW | CG1a) increase treble level (e.g., of field or beam) |
| GG2a) holding one hand to ear while holding other open palm upright above chin level and rotating CCW | CG2a) decrease treble level (e.g., of field or beam) |
| GG1b) holding one hand to ear while holding other open palm upright at chin level and rotating CW | CG1b) increase midrange level (e.g., of field or beam) |
| GG2b) holding one hand to ear while holding other open palm upright at chin level and rotating CCW | CG2b) decrease midrange level (e.g., of field or beam) |
| GG1c) holding one hand to ear while holding other open palm upright below chin level and rotating CW | CG1c) increase bass level (e.g., of field or beam) |
| GG2c) holding one hand to ear while holding other open palm upright below chin level and rotating CCW | CG2c) decrease bass level (e.g., of field or beam) |
| GH1) locking (clockwise rotation of closed hand) | CH1) disable changes to sound field configuration |
| GH2) unlocking (CCW rotation of closed hand) | CH2) enable changes to sound field configuration |

FIG. 9

| REPRESENTED GESTURE | CORRESPONDING COMMAND |
|---|---|
| GC1a) moving hands toward each other horizontally to shoulder width | CC1a) reduce beam width by one unit (e.g., one dB) |
| GC2a) moving hands away from each other horizontally from shoulder width | CC2a) increase beam width to maximum |
| GC1b) moving hands toward each other horizontally from shoulder width | CC1b) reduce beam width to minimum |
| GC2b) moving hands away from each other horizontally to shoulder width | CC2b) increase beam width by one unit (e.g., one dB) |

FIG. 10

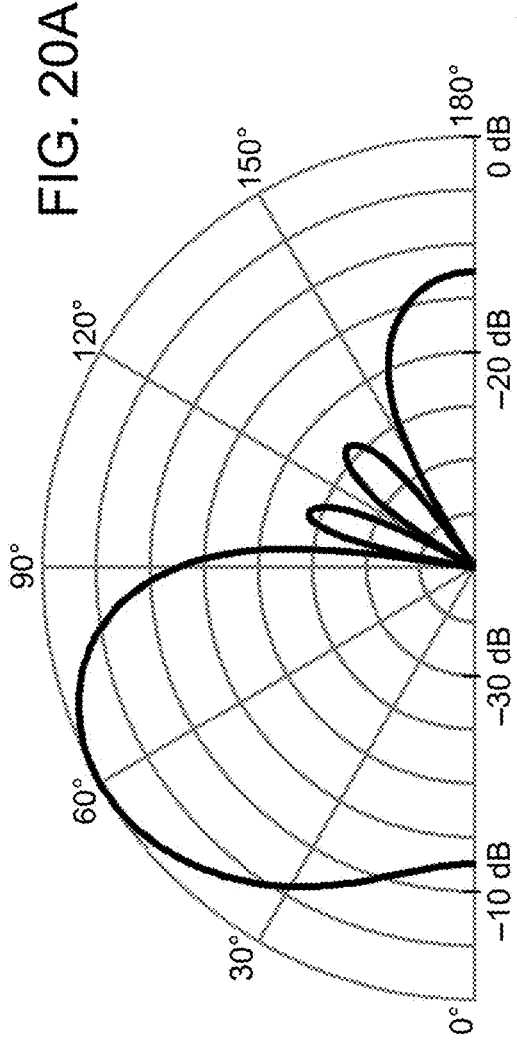
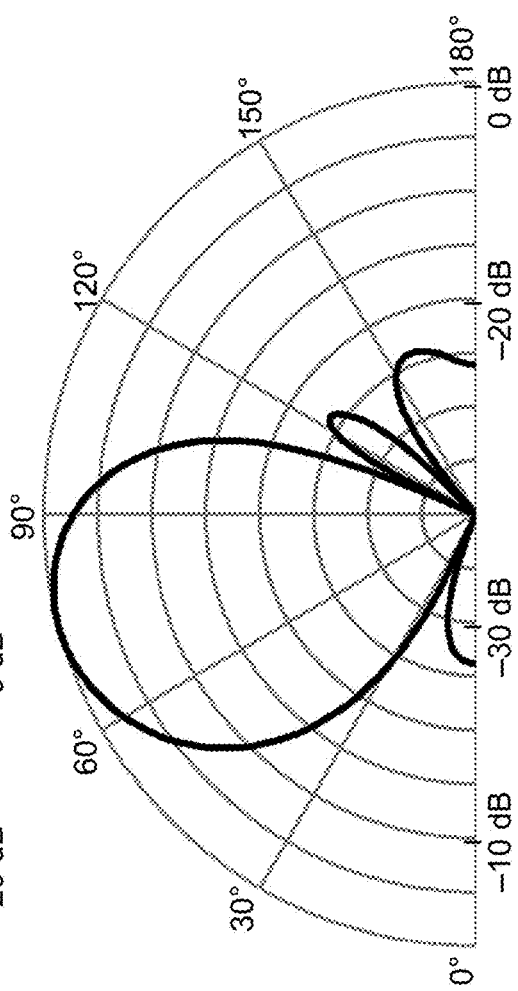
FIG. 20A
FIG. 20B

FIG. 23A
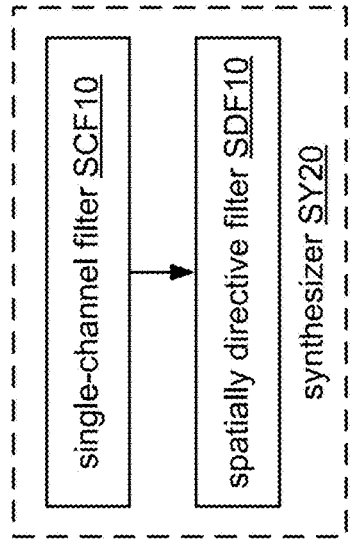
FIG. 23B
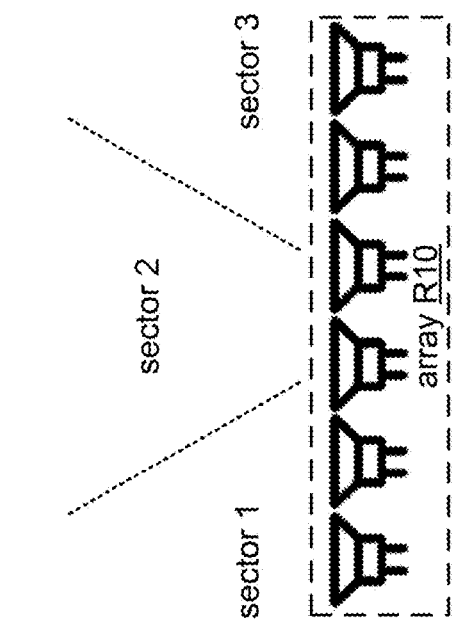
FIG. 23C
FIG. 23D

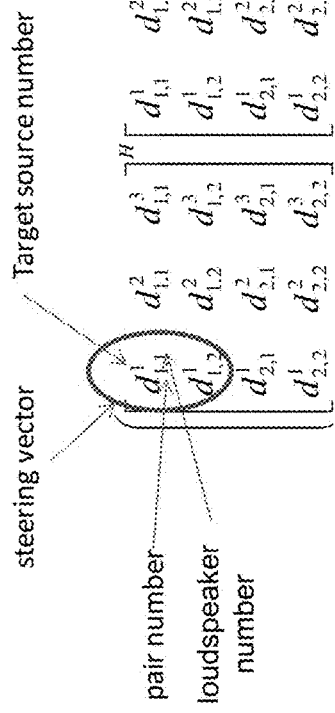

$$\arg\max_i \left( \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix}^H \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix} (\Gamma + \lambda \cdot I)^{-1} \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix}^H \begin{bmatrix} d^1_{1,1} & d^2_{1,1} & d^3_{1,1} \\ d^1_{1,2} & d^2_{1,2} & d^3_{1,2} \\ d^1_{2,2} & d^2_{2,2} & d^3_{2,2} \end{bmatrix} (\Gamma + \lambda \cdot I)^{-1} \begin{bmatrix} d^i_{1,1} \\ d^i_{1,2} \\ d^i_{2,2} \end{bmatrix} \right)$$

FIG. 27

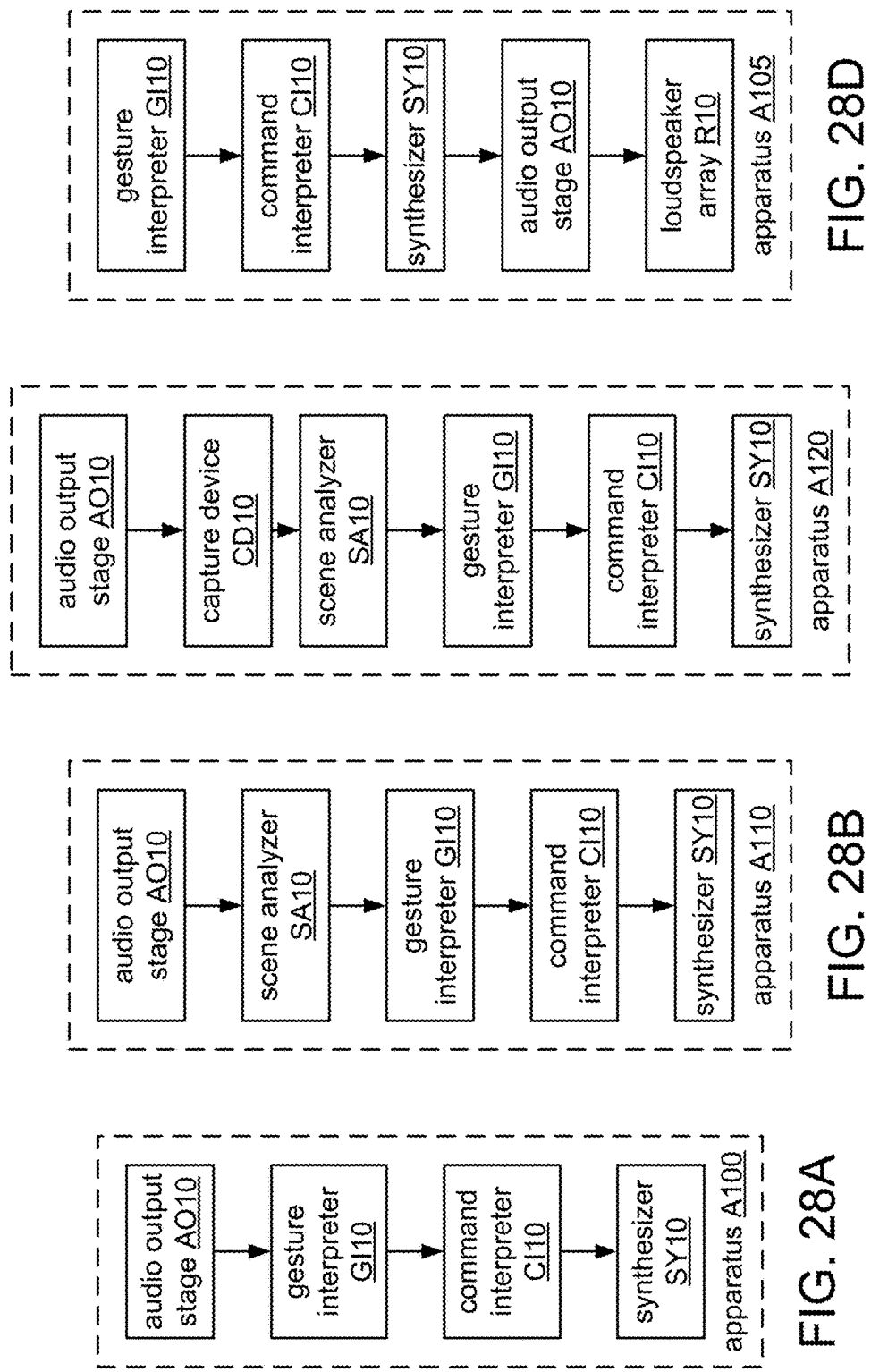

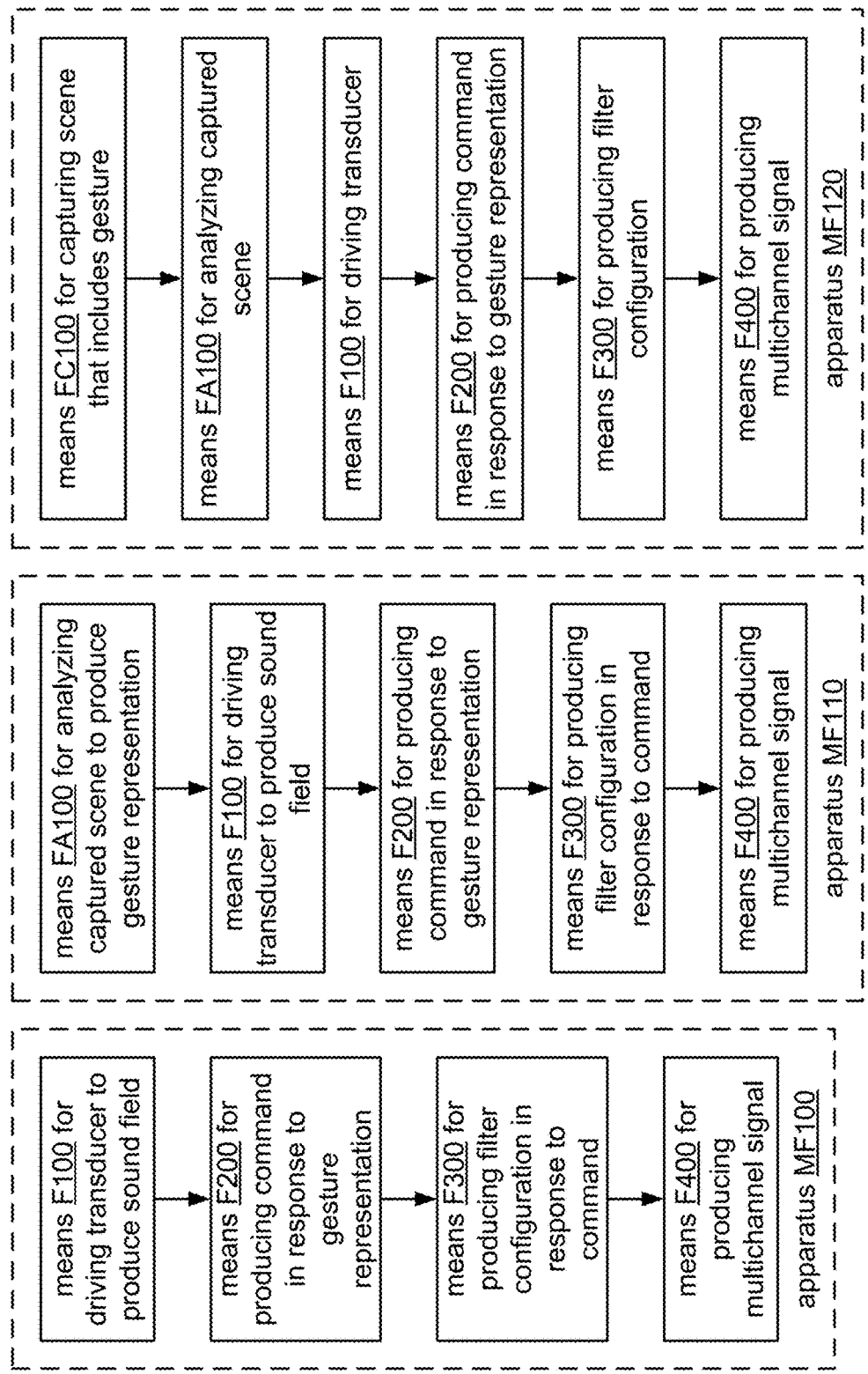

SYSTEMS, METHODS, APPARATUS, AND COMPUTER-READABLE MEDIA FOR GESTURAL MANIPULATION OF A SOUND FIELD

CLAIM OF PRIORITY UNDER 35 U.S.C. § 119

The present application for patent claims priority to Provisional Application No. 61/619,202, entitled "SYSTEMS, METHODS, APPARATUS, AND COMPUTER-READABLE MEDIA FOR GESTURAL MANIPULATION OF A SOUND FIELD," filed Apr. 2, 2012, and assigned to the assignee hereof.

BACKGROUND

Field

This disclosure relates to gesture-driven acoustic field modification.

Background

Loudspeaker arrays having a reasonable amount of elements may be used to perform various sound field modifications. For example, loudspeaker beamformers can be used to steer a sound beam into different directions and/or create acoustic null beams. In another example, a loudspeaker array may be driven using wavefield synthesis to resynthesize a realistic wavefront of a true sound field. Wavefield synthesis is described in such documents as U.S. Publ. Pat. Appls. Nos. 2006/0098830 A1 (Roeder et al.), 2007/0269062 A1 (Rodigast et al.), and 2008/0101616 A1 (Melchior et al.). Other creative uses of loudspeaker arrays include rendering such effects as surround sound, expanded sound images, etc.

SUMMARY

A method of signal processing according to a general configuration includes driving a directionally controllable transducer to produce a sound field that includes a beam; producing a command in response to a representation of a gesture; producing a filter configuration in response to said command; and applying a spatially directive filter to an input signal to produce a multichannel signal. In this method, the spatially directive filter is based on the filter configuration, the gesture indicates a change in at least one among a direction of the beam and a width of the beam, and the command is a command to perform the indicated change. Computer-readable storage media (e.g., non-transitory media) having tangible features that cause a machine reading the features to perform such a method are also disclosed.

An apparatus for signal processing according to another general configuration includes means for driving a directionally controllable transducer to produce a beam; means for producing a command in response to a representation of a gesture; means for producing a filter configuration in response to said command; and means for performing a spatially directive filtering operation on an input signal to produce a multichannel signal. In this apparatus, the spatially directive filter is based on the filter configuration, the gesture indicates a change in at least one among a direction of the beam and a width of the beam, and the command is a command to perform the indicated change.

An apparatus for signal processing according to another general configuration includes an audio output stage configured to drive a directionally controllable transducer to produce a beam; a gesture interpreter configured to produce a command in response to a representation of a gesture; a command interpreter configured to produce a filter configuration in response to said command; and a synthesizer configured to apply a spatially directive filter to an input signal to produce a multichannel signal. In this apparatus, the spatially directive filter is based on the filter configuration, the gesture indicates a change in at least one among a direction of the beam and a width of the beam, and the command is a command to perform the indicated change.

BRIEF DESCRIPTION OF THE DRAWINGS

FIGS. 2A and 2B show an example of a blocking gesture by a user.

FIGS. 5A and 5B show an example of a redirection gesture by a user.

FIGS. 8-10 show examples of mappings of gesture representations to commands.

FIGS. 20A and 20B show examples of beam patterns for weighted modifications of the DSB filters of FIGS. 19A and 19B, respectively.

FIGS. 23A and 23B show examples of schemes having three and five selectable fixed spatial sectors, respectively.

FIG. 23C shows an example of a table as may be referenced by an implementation of task T300.

FIG. 23D shows a block diagram of an implementation SY20 of synthesizer SY10.

FIGS. 26A, 26B, 26C, and 27 show aspects of pairwise BFNF operations.

FIG. 28A shows a block diagram of an apparatus A100 according to a general configuration.

FIG. 28B shows a block diagram of an implementation A110 of apparatus A100.

FIG. 28C shows a block diagram of an implementation A120 of apparatus A110.

FIG. 28D shows a block diagram of an implementation A105 of apparatus A100.

FIG. 29A shows a block diagram for an apparatus MF100 according to a general configuration.

FIG. 29B shows a block diagram for an implementation MF110 of apparatus MF100.

FIG. 29C shows a block diagram for an implementation MF120 of apparatus MF110.

DETAILED DESCRIPTION

Figure 1A:
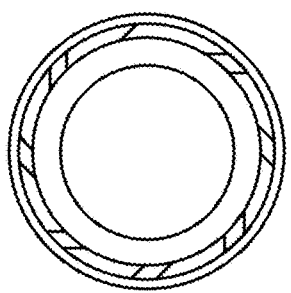
FIG. 1A shows an example of a cone-type loudspeaker.

A loudspeaker array may be used to generate a listening zone. It is possible to use a linear, circular, or planar array of loudspeakers to synthesize the wavefront of a realistic sound field (e.g., using wavefield synthesis). With a linear array, it is also possible to steer the reproduced sound field so that it is beamed to one direction, with the energy in other directions being much lower. This disclosure describes systems that integrate gesture recognition with sound field modification. Such an integrated system may be used to drive such sound field generation and/or modification with representative gestures, so that a naïve user can initiate such actions as blocking sound radiation or directing a sound beam with representative actions.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

It may be assumed that in the near-field and far-field regions of an emitted sound field, the wavefronts are spherical and planar, respectively. The near-field may be defined as that region of space which is less than one wavelength away from a sound receiver (e.g., a microphone array). Under this definition, the distance to the boundary of the region varies inversely with frequency. At frequencies of two hundred, seven hundred, and two thousand hertz, for example, the distance to a one-wavelength boundary is about 170, fortynine, and seventeen centimeters, respectively. It may be useful instead to consider the near-field/far-field boundary to be at a particular distance from the microphone array (e.g., fifty centimeters from a microphone of the array or from the centroid of the array, or one meter or 1.5 meters from a microphone of the array or from the centroid of the array). Unless otherwise indicated by the particular context, a far-field approximation is assumed herein.

Figure 1B:
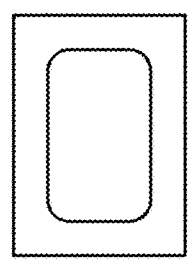
FIG. 1B shows an example of a rectangular loudspeaker.
Figure 1C:
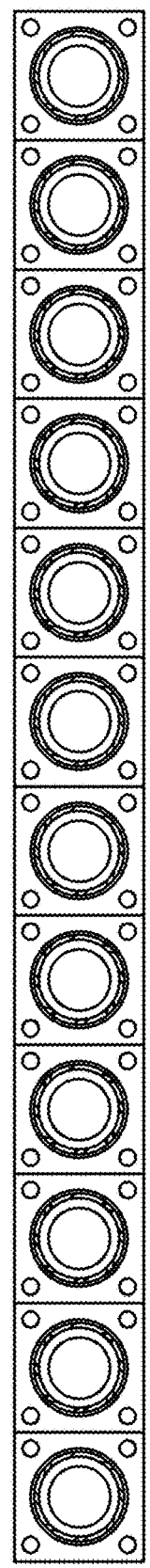
FIG. 1C shows an example of an array of twelve loudspeakers as shown in FIG. 1A.
Figure 1D:
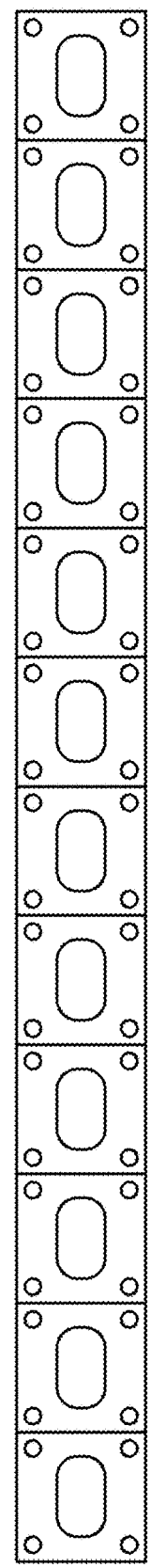
FIG. 1D shows an example of an array of twelve loudspeakers as shown in FIG. 1B.
Figure 3A:
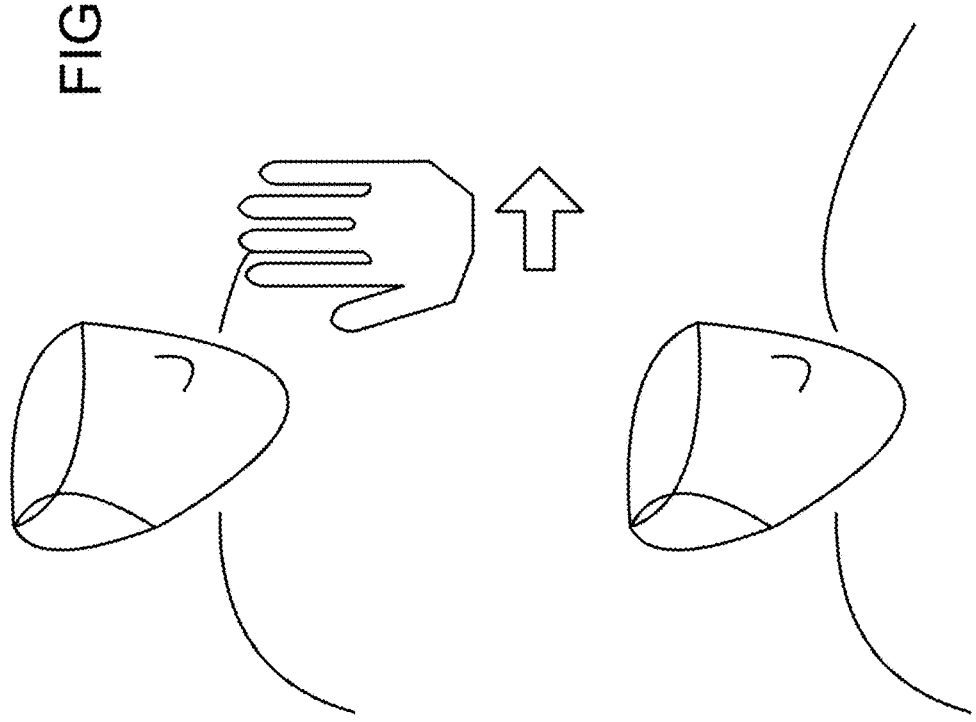
FIGS. 3A and 3B show an example of another blocking gesture by a user.
Figure 3B:
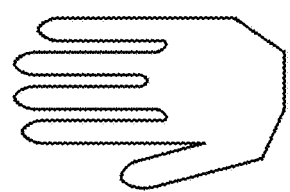
Figure 4B:
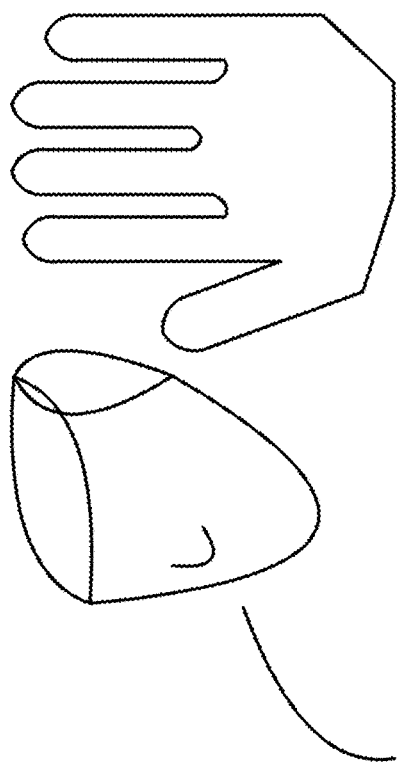
FIGS. 4A and 4B show an example of another blocking gesture by a user.
Figure 4A:
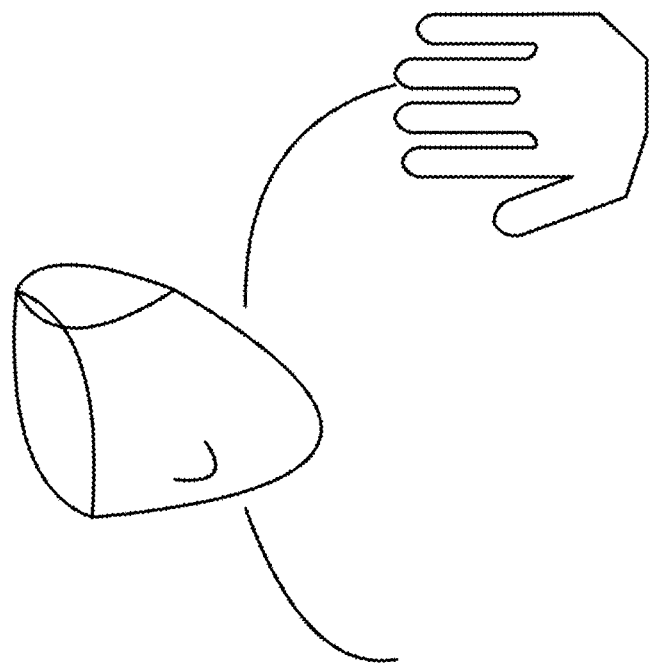

FIG. 1A shows an example of a cone-type loudspeaker, and FIG. 1B shows an example of a rectangular loudspeaker (e.g., RA11×15×3.5, NXP Semiconductors, Eindhoven, NL). FIG. 1C shows an example of an array of twelve loudspeakers as shown in FIG. 1A, and FIG. 1D shows an example of an array of twelve loudspeakers as shown in FIG. 1B. The examples of FIGS. 1C and 1D may be implemented, for example, such that the inter-loudspeaker distance is 2.6 cm and the length of the array (31.2 cm) is approximately equal to the width of a typical laptop computer, but these examples are not limited to these particular dimensions, and the principles described herein may be practiced with directionally controllable transducers (e.g., loudspeaker arrays) of any dimension.

Configuration parameters for rendering systems that include such a loudspeaker array are usually expressed literally (e.g., in scientific terms) rather than descriptively. Such configuration parameters may include the angle into which the beamformer is to steer the sound, the width of the beam, and the volume of the sound (see, e.g., FIG. 11 of U.S. Publ. Pat. Appl. No. 2010/0098275 A1 (Metcalf)). Although such parameters are already high-level abstractions from the point of view of a researcher, they may be more appropriate for a test engineer than for a user trying to use the array on a device such as a telephone or a tablet or laptop computer.

When such a loudspeaker array is integrated into or coupled with a personal computing device (for example: a laptop, netbook, or tablet computer; a smartphone; a set-top box or video playback device; a gaming console; etc.) or television display, it may be desirable to allow the user to adjust the operation of the array in real time. For consumer applications, however, it may be desirable to avoid requiring the user to determine and specify the detailed configuration parameters of the array each time the sound field is to be changed, and more user-friendly solutions (e.g., a simple and more descriptive user interface) and integrated systems may be desirable. For example, it may be desirable to implement an interface that adjusts the array in real time in response to what the user is doing.

A conventional approach to sound field modification might require a user to find buttons on a remote control, to interrupt viewing in order to manipulate an on-screen user interface, and/or to learn voice commands. This disclosure describes integration of different sensory information to control sound production. By configuring the system to respond appropriately to representative gestures, a new user experience is achieved, and better ways to take advantage of the ability of the sound-field modification algorithm and the loudspeaker array hardware can be explored.

If a user does not want to hear sound from a particular direction, an action to indicate the desired change might be for the user to raise his hand or hands as if to block the sound. Such an action may be characterized as a gesture of raising a hand into a defensive or protective gesture, with the open palm facing outward. The sequence of FIGS. 2A and 2B shows one example of how a user may perform such a gesture over time. Another action to indicate that a sound is unwanted might be for the user to move an open hand outwardly (e.g., a movement of the hand away from the user as if to block or push away an external sound). The sequences of FIGS. 3A-3B and FIGS. 4A-4B show two examples of how a user may perform such a gesture over time. A gesture of presenting a hand with the open palm facing outward in such manner may also be referred to as a "talk-to-the-hand" gesture.

If the user wants to move a sound beam to a different direction, an action to indicate the desired change might be for the user to move his or her hands toward each other (e.g., as if to grasp the sound beam) and then to move the hands in unison to the desired direction. The sequence of FIGS. 5A and 5B shows one example of how a user may perform such a gesture over time.

Figure 6B:
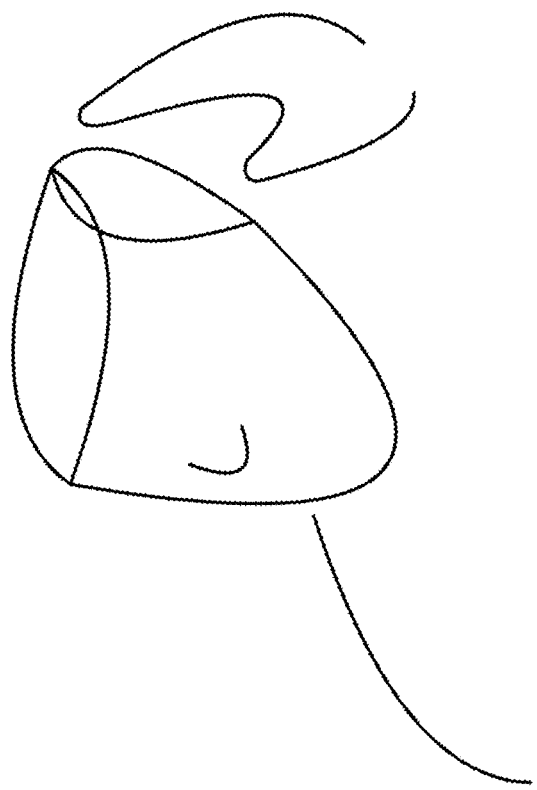
FIGS. 6A and 6B show an example of an ear-cupping gesture by a user.
Figure 6A:
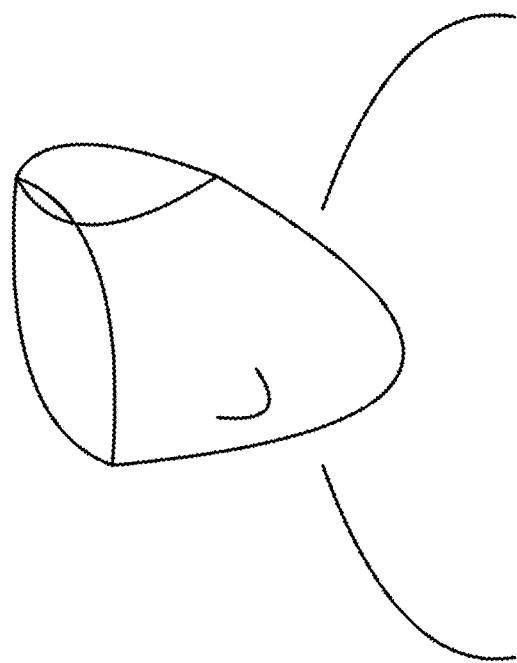

If a user is not able to hear a sound in a particular direction clearly and wants the sound field to be focused toward his or her ear, an action to indicate the desired change might be for the user to cup a hand over the ear, and possibly also to lean his or her head in the direction of that ear. Such an action may be characterized as a gesture of raising a hand to the user's ear (e.g., raising a hand next to the user's face), with the palm facing forward and possibly with the fingers partially curled forward (e.g., a hand cupped to the ear). FIGS. 6A and 6B show a progression of such a gesture over time.

At a top level, an integrated system for sound field modification may be realized according to a "recognize→analyze→synthesize" paradigm. Such a structure may be designed to recognize a desired change as indicated by the user, to analyze the indicated change in the current context, and to synthesize a modified sound field to implement the indicated change. A device may be used to capture the representative human gesture, which is then interpreted into one of the possible patterns. According to separate patterns, decisions are made and a corresponding sound field is synthesized. Typically the synthesis will be based on further information from the detail of the gestures, which may include a position of the hand, an identification of an accurate orientation, etc. In one example, the system drives a loudspeaker array (e.g., as shown in FIG. 1C or 1D) to produce a sound field that includes a concentration of energy in a first direction, and recognizes a gesture performed within the sound field, wherein the gesture indicates a second direction in the plane of the loudspeaker array.

Figure 7C:
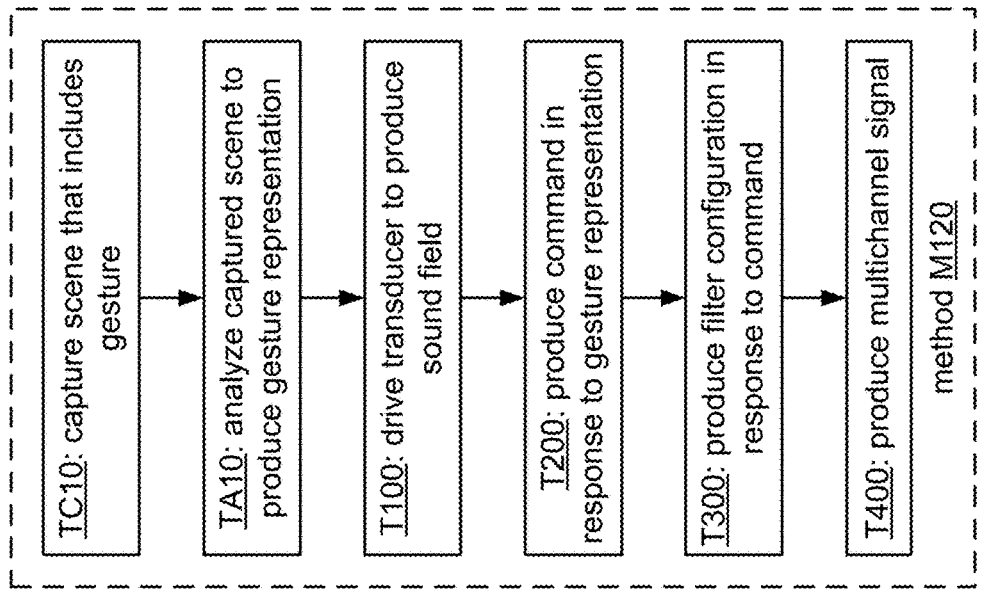
FIG. 7C shows a flowchart for an implementation M120 of method M110.
Figure 7B:
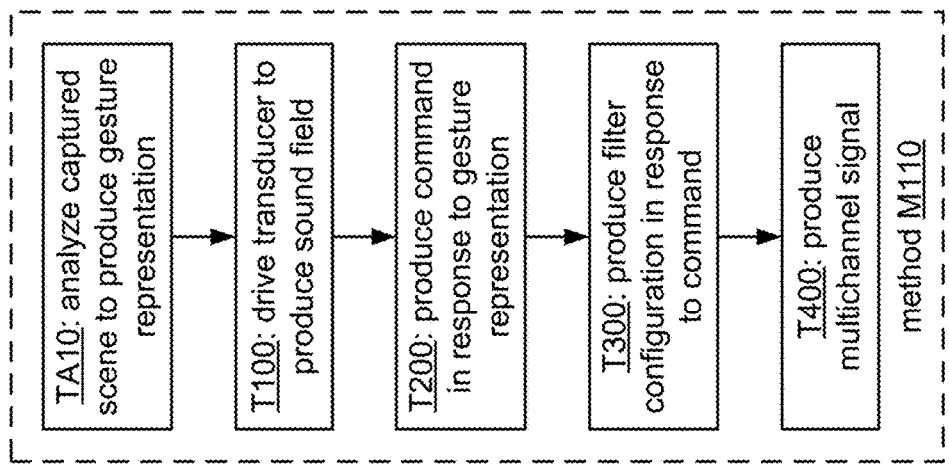
FIG. 7B shows a flowchart for an implementation M110 of method M100.
Figure 7A:
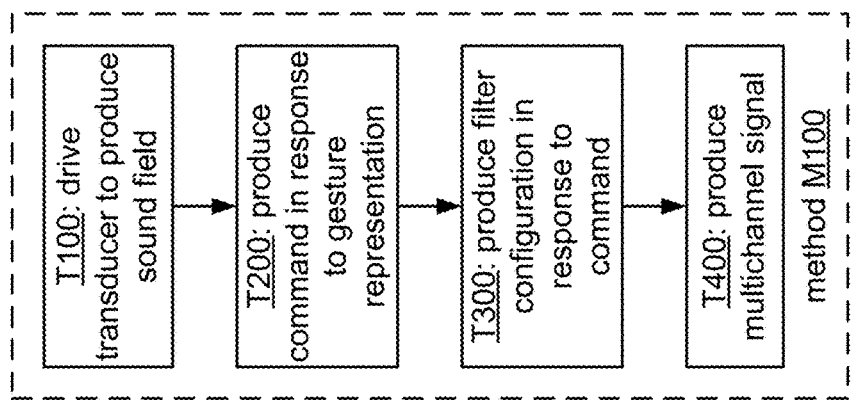
FIG. 7A shows a flowchart for a method M100 according to a general configuration.

FIG. 7A shows a flowchart of a method of audio signal processing M100 according to a general configuration that includes a sound-field producing task T100, a gesture interpretation task T200, a command interpretation task T300, and a signal synthesis task T400. Sound-field producing task T100 drives a directionally controllable transducer (e.g., an array of loudspeakers) to produce a sound field that includes a beam. A beam is defined as a concentration of energy along a particular angular or spatial direction relative to the transducer. For example, task T100 may be implemented as a beamforming operation in the time domain and/or in a frequency domain, as discussed herein.

Gesture interpretation task T200 produces a command to perform a change in at least one among a direction of the beam and a width of the beam. Task T200 produces this command in response to a representation of a gesture that indicates the change. Task T200 may be implemented to produce the command according to a mapping of the representation to the command, which may be embodied in a lookup table or similar structure. FIGS. 8-10 show examples of such mappings.

In response to the command produced by task T200, command interpretation task T300 produces a filter configuration. The filter configuration may include a set of filter coefficients that describe a spatially directive filtering operation (e.g., a beamforming operation) in the time domain and/or in a frequency domain. Alternatively, the filter configuration may describe a modification to such a set of filter coefficients.

Signal synthesis task T400 produces a multichannel signal by applying a spatially directive filter that is based on the filter configuration to an input signal. For example, task T400 may be implemented as a beamforming operation in the time domain and/or in a frequency domain.

Task T100 drives a directionally controllable transducer to produce a sound field that includes a beam. Task T100 is typically implemented to drive the transducer based on a multichannel signal that is produced by a spatially directive filter, such as a beamformer or a wavefield synthesis (WFS) rendering technique. For example, the driving signal may be based on a multichannel signal produced by an instance of signal synthesis task T400 in a previous execution of method M100. For a case in which the transducer is an array of loudspeakers, it is typical for the driving signal to be a multichannel signal such that each channel drives a particular corresponding loudspeaker of the array.

It may be desirable to implement task T100 to produce the driving signal to induce constructive interference in a desired direction of the produced sound field (e.g., in the direction of the beam) while inducing destructive interference in other directions of the produced sound field (e.g., in directions outside the mainlobe of the beam). For example, task T100 may be implemented to drive the transducer to create a beam of acoustic energy that is concentrated in a desired direction and to create a valley in the beam response in other directions. FIGS. 18A-22B show examples of beam patterns that are discussed in more detail below.

In general, task T100 may be implemented to drive a linear loudspeaker array, having a uniform or nonuniform spacing between adjacent loudspeakers, or a nonlinear (e.g., shaped) array of loudspeakers. It is also possible to implement task T100 to drive portions of the transducer (e.g., subarrays of a loudspeaker array) differently for different frequency ranges. Such an implementation may provide better directivity for wideband reproduction. In one such example, task T100 is implemented to drive a loudspeaker array with a first driving signal having a first frequency range, and to drive alternate loudspeakers of the array with a second driving signal that has a second frequency range lower than the first frequency range.

Figure 11:
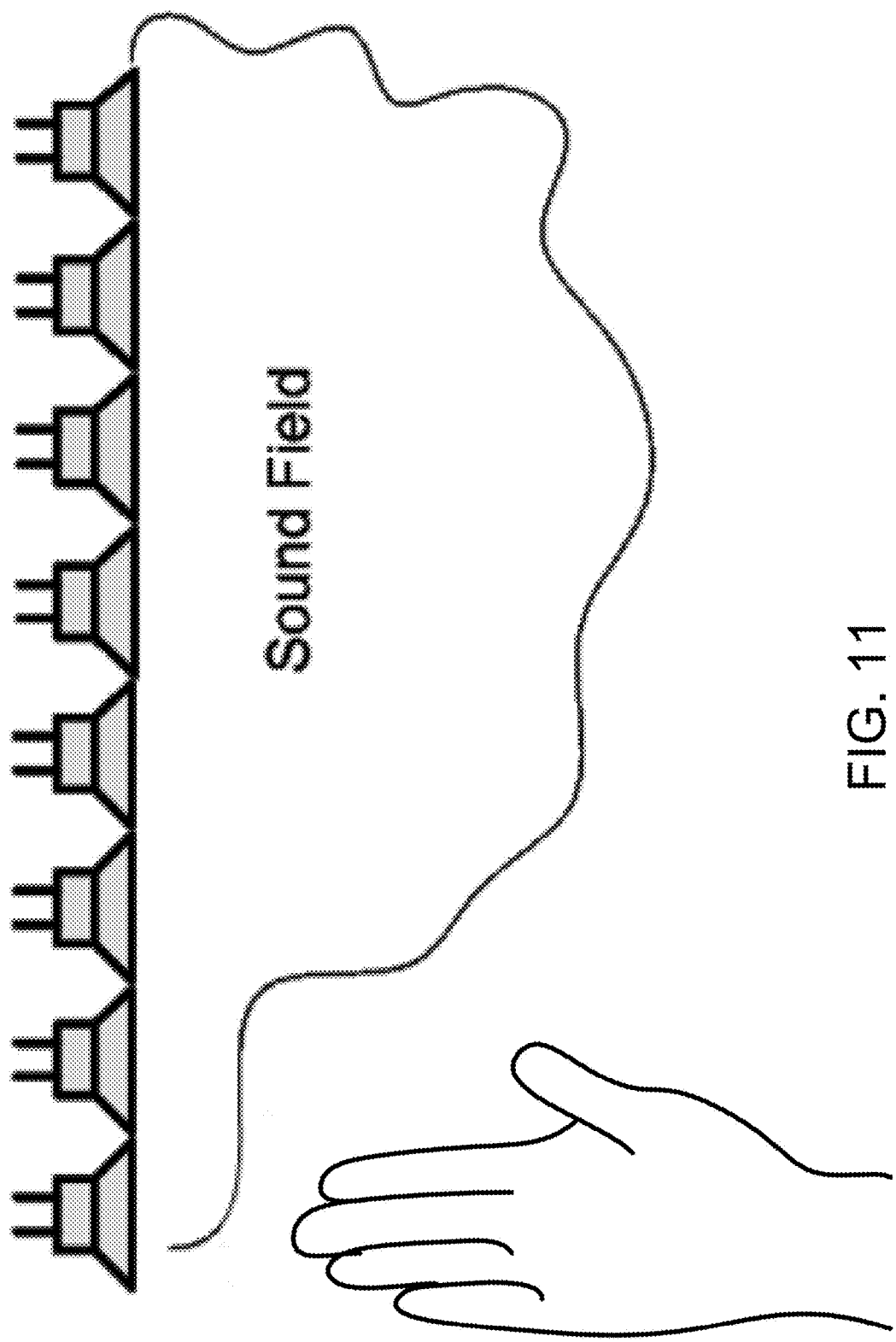
FIG. 11 illustrates a response of the system to a blocking gesture.

Gesture interpretation task T200 may be implemented to produce a command to perform the indicated change by applying the gesture representation as an index to a lookup table or similar structure that maps gesture representations to corresponding commands. Some examples of such mappings of represented gestures to corresponding commands are discussed below:

A) A representation of a blocking or pushing gesture (e.g., a "talk-to-the-hand" gesture) may be mapped to a command to reduce the intensity of a beam in the user's direction or to create a local null in the sound field (e.g., as shown in FIG. 11). If the user wants to raise the local sound level instead, an action to indicate the desired change might be for the user to make a beckoning gesture. Such a gesture may be characterized as presenting a raised hand with the palm facing toward the user (which orientation may be indicated by the outward position of the thumb with respect to, e.g., the user's face), combined with curling the fingers of the hand into the palm. Alternatively, a beckoning gesture may be characterized as a raised and open palm-inward hand combined with a decrease in size and/or an increase in distance of the hand. A representation of a beckoning or pulling gesture may be mapped to a command to create a local beam in the sound field or to reduce the intensity of an existing beam in the user's direction. FIG. 8 shows examples of such mappings at rows GA1-CA1 and GA2-CA2.

Figure 12:
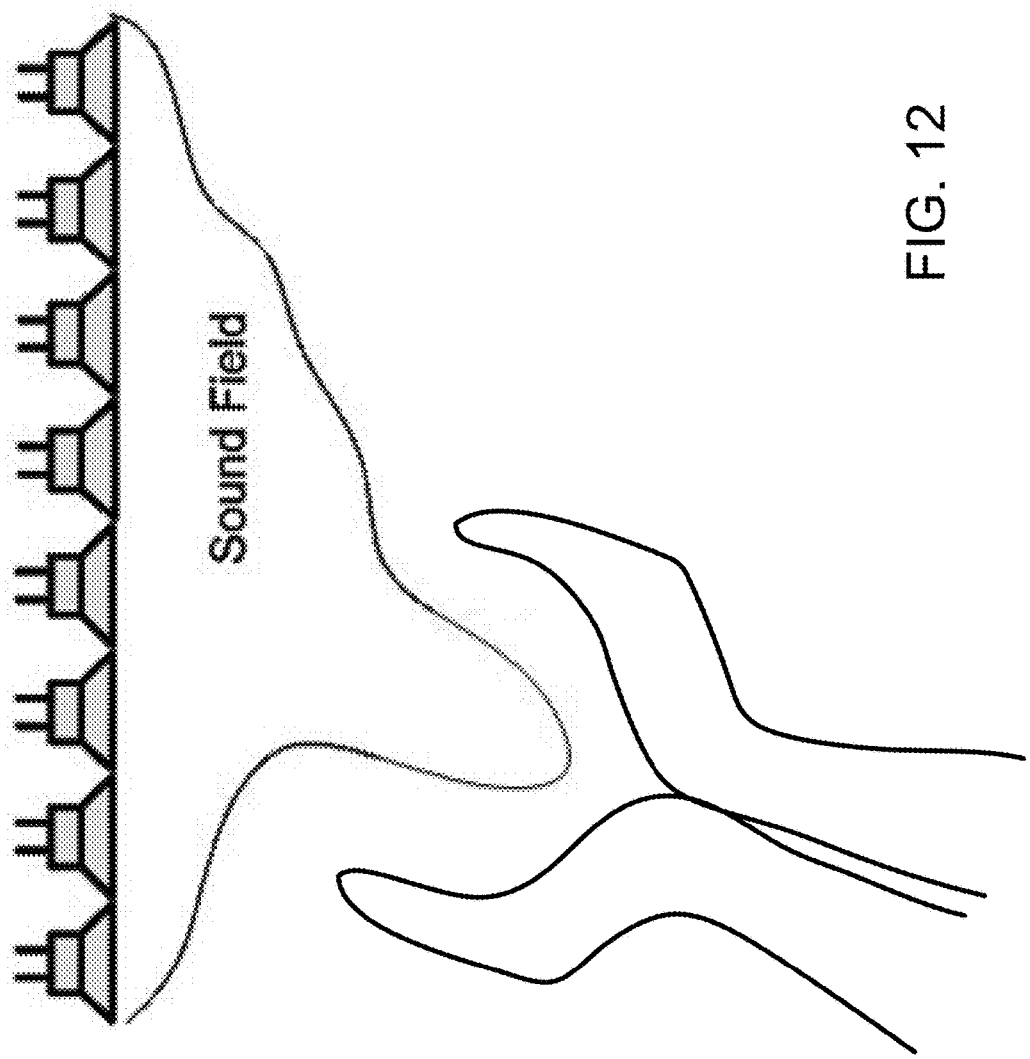
FIG. 12 illustrates a response of the system to a redirection gesture.

B) If the user wants to move a sound beam to a different direction, an action to indicate the desired change might be for the user to move her hands toward each other (e.g., as if to grasp the sound beam) and then to move the hands in unison to the desired direction. The sequence of FIGS. 5A and 5B shows one example of how a user may perform such a gesture over time. Alternatively, such a desired change may be indicated by a gesture that includes the sequence of bringing the hands together (e.g., in a cupping motion), then translating the hands together to a new position, then moving the hands apart from one another (alternatively, holding the hands together at the new position for some period, such as one or two seconds). A one-handed version of such a gesture may be characterized as the appearance of an open-palm-outward hand (possibly followed by a motion of the fingers curling inward toward the palm) that is then moved to one side or the other to indicate the desired direction. Another one-handed version of such a gesture includes the sequence of closing a hand, then translating the closed hand to a new position, then opening the hand (alternatively, holding the hand stationary in the new position for some period, such as one or two seconds). A representation of such a redirecting gesture may be mapped to a command to steer (e.g., to translate) a beam from the original direction into the indicated direction (e.g., as shown in FIG. 12). FIG. 8 shows examples of such mappings at rows GB1-CB1 and GB2-CB2.

C) If the user wants to focus a beam into his own direction (e.g., to increase privacy for a telephone call), an action to indicate the desired change might be for the user to show his hands spaced wide apart in a horizontal direction and then to bring the hands together. A representation of such a gesture may be mapped to a command to create a beam in the user's direction and confine the input signal to that beam, or to reduce the width of an existing beam in the user's direction. Similarly, a gesture of moving the hands away from each other in a horizontal direction may indicate a desired change to increase the width of a sound beam and may be mapped to such a command.

FIG. 8 shows examples of such mappings at rows GC1-CC1 and GC2-CC2. FIG. 10 shows alternate examples of such mappings at rows GC1a-CC1a, GC1b-CC1b, GC2a-CC2a, and GC2b-CC2b.

Figure 13:
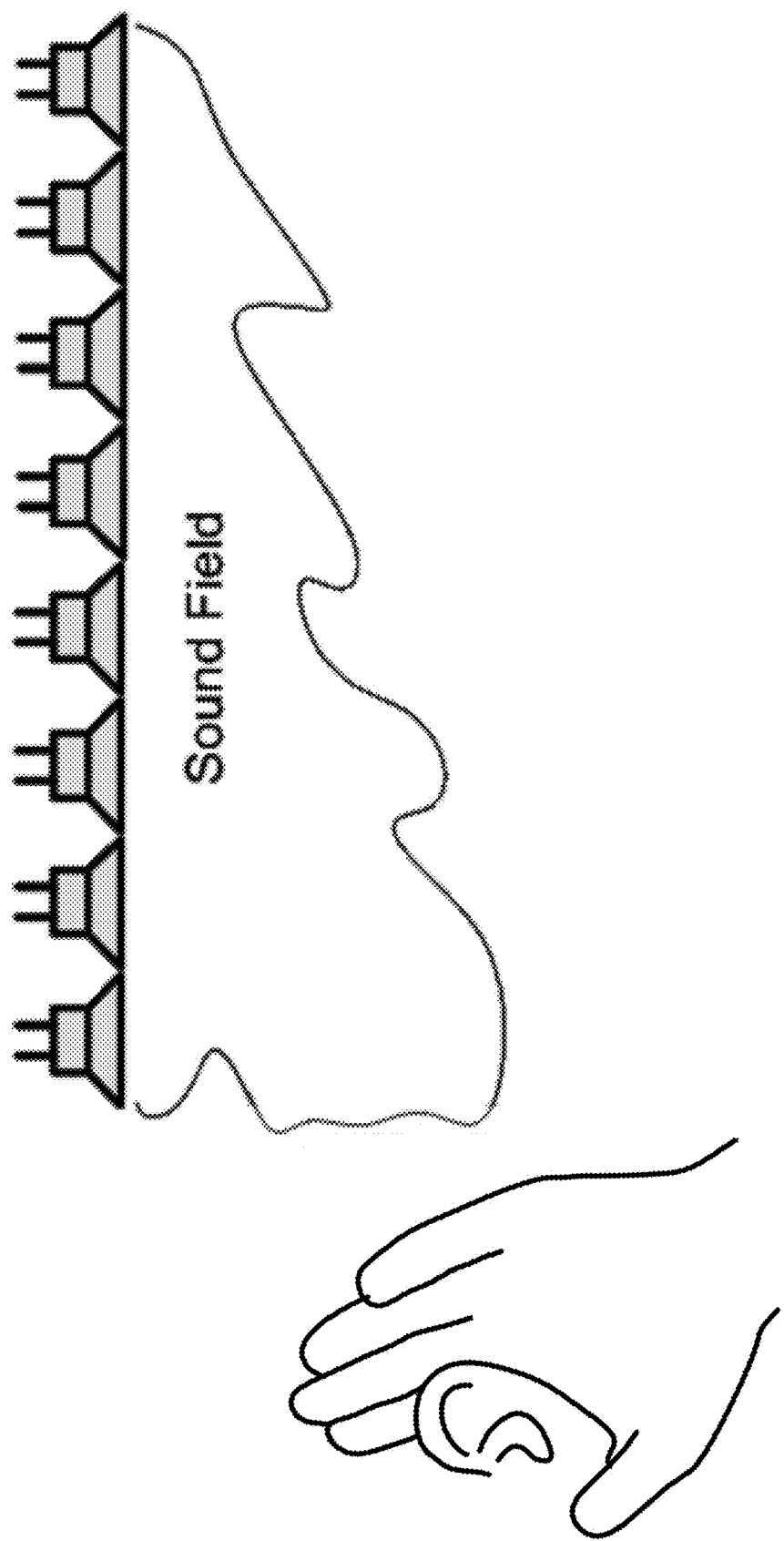
FIG. 13 illustrates a response of the system to an ear-cupping gesture.

D) If a user is not able to hear a sound in a particular direction clearly and wants to focus a sound field in her direction or otherwise to make the sound field more intelligible (e.g., in a noisy environment), an action to indicate the desired change might be for the user to cup her hand over her ear, and possibly also to lean her head toward that direction. Such an action may be characterized as a gesture of raising a hand to the user's ear (e.g., raising a hand next to the user's face), with the palm facing forward and possibly with the fingers partially curled forward (e.g., a hand cupped to the ear). FIGS. 6A and 6B show a progression of such a gesture over time. A representation of such a gesture may be mapped to a command to create or intensify a beam in the direction of the ear (e.g., to increase the local volume), to redirect an existing beam toward the ear, or otherwise to boost a level of the sound field in that direction as shown, for example, in FIG. 13. Alternatively or additionally, a representation of such a gesture may be mapped to a command to compress the dynamic range of the sound field locally or globally and/or to enhance a perceived loudness of the sound field locally or globally (e.g., via bass boosting and/or psychoacoustic bass enhancement (PBE)). FIG. 8 shows an example of such a mapping at row GD1-CD1.

Conversely, if the user wants to reverse such a focus, an action to indicate the desired change might be for the user to make an erasing or waving-away gesture. Such a gesture may be characterized as a raised hand held with the open palm outward (typically with the fingers separated rather than together) and moved back and forth around a pivot at the base of the hand (i.e., moved by rotating the upper arm back and forth about its axis). A representation of such a gesture may be mapped to a command to return a local volume, dynamic range, and or loudness compensation operation to a default level. FIG. 8 shows an example of such a mapping at row GD2-CD2.

Figure 14:
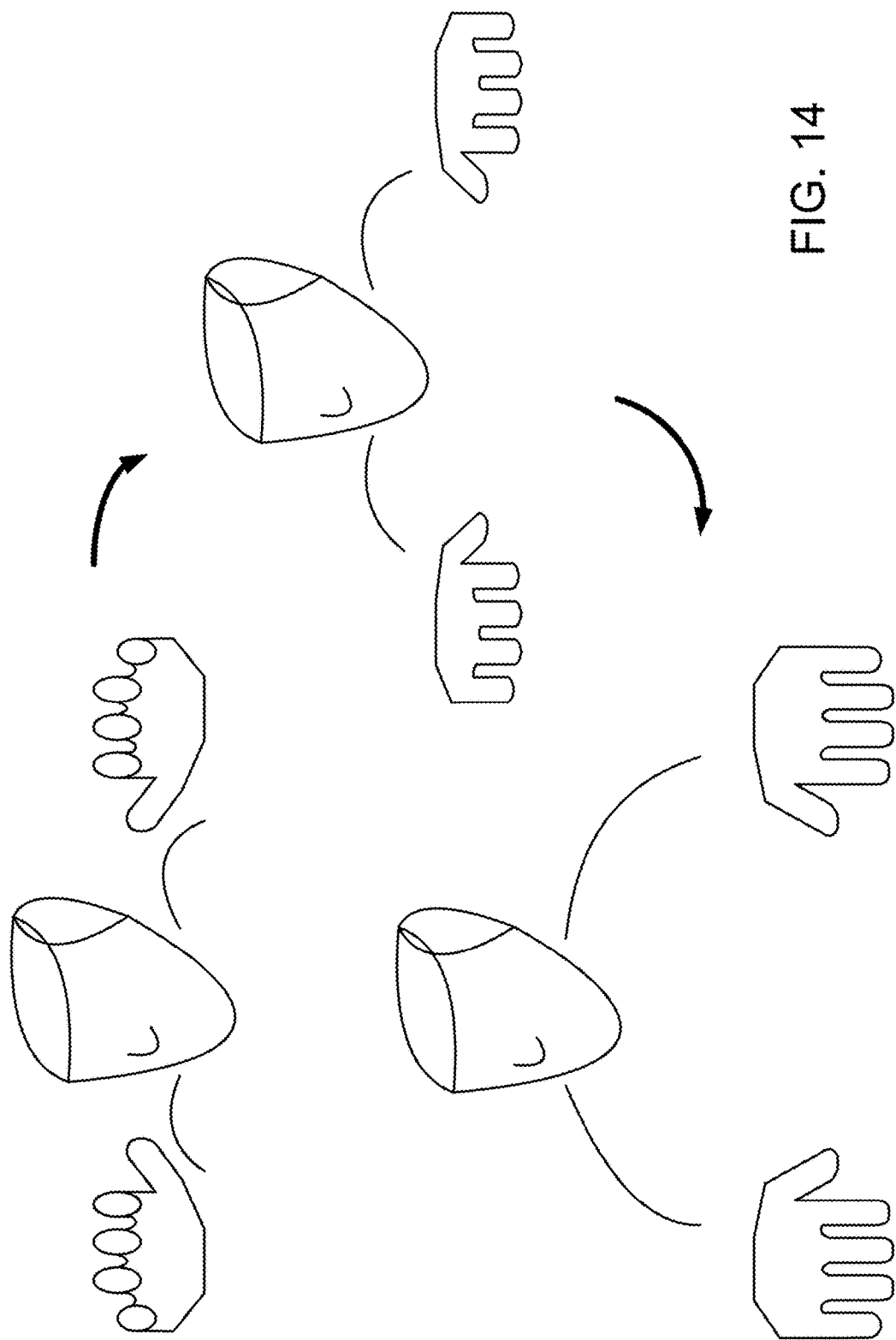
FIG. 14 shows an example of a global suppression gesture by a user.

E) If a user wants to increase the volume of the entire sound field, an action to indicate the desired change might be for the user to raise both hands together (with the palms up or with the palms down), and a representation of such a gesture may be mapped to a command to increase the overall volume of the sound field. Similarly, if a user wants to reduce the volume of the entire sound field, an action to indicate the desired change might be for the user to lower both hands together (e.g., with the palms down, as shown in the example of FIG. 14), and a representation of such a gesture may be mapped to a command to decrease the overall volume of the sound field. FIG. 8 shows examples of such mappings at rows GE1-CE1 and GE2-CE2.

F) If a user wants to reduce the volume or compress the dynamic range of the sound field (at least in the direction of the user), an action to indicate the desired change might be for the user to move the hands toward each other in a vertical direction or to hold one hand to an ear while lowering the other hand. A representation of such a gesture may be mapped to a command to reduce the volume or compress the dynamic range of the sound field (either locally or globally). FIG. 8 shows an example of such a mapping at row GF1-CF1. FIG. 9 shows another example of such a mapping at row GF3-CF3.

Similarly, if a user wants to increase the volume or expand the dynamic range of the sound field (at least in the direction of the user), an action to indicate the desired change might be for the user to move the hands away from each other in a vertical direction, or to hold one hand to an ear while raising the other hand. A representation of such a gesture may be mapped to a command to increase the volume or expand the dynamic range of the sound field (either locally or globally). FIG. 8 shows an example of such a mapping at row GF2-CF2. FIG. 9 shows another example of such a mapping at row GF4-CF4.

G) If a user wants to increase or decrease the level of a frequency band of the sound field relative to the levels of the other bands (e.g., for equalization), an action to indicate the desired change might be for the user to hold one hand to an ear while holding the other hand upright with the palm outward and rotating this hand clockwise or counter-clockwise (e.g., as if turning a knob or wheel), respectively, from the user's viewpoint. A representation of such a gesture may be mapped to a command to increase or decrease the level of a particular frequency band. The frequency band whose level is to be adjusted (e.g., bass, midrange, treble) may be indicated by the height of the rotating hand (e.g., with the hand held high to indicate treble and held low to indicate bass). FIG. 9 shows examples of such mappings at rows GG1a-CG1a, GG2a-CG2a, GG1b-CG1b, GG2b-CG2b, GG1c-CG1c, and GG2c-CG2c.

H) If a user wants to disable changes to the current sound field configuration, an action to indicate the desired change might be for the user to present an open hand palm-outward and to close the hand while rotating it clockwise. A representation of such a locking gesture may be mapped to a command to disable changes to the current sound field configuration, or to disable particular changes (e.g., a change in beam direction) while permitting other changes (e.g., a change in local sound level). Similarly, if a user wants to enable changes to the current sound field configuration, an action to indicate the desired change might be for the user to present a closed hand and to open the hand while rotating it counter-clockwise. A representation of such an unlocking gesture may be mapped to a command to enable changes to the current sound field configuration. FIG. 9 shows examples of such mappings at rows GH1-CH1 and GH2-CH2.

The range of actions associated with different gesture representations in a particular implementation may include any one or more of the examples set forth above and/or in FIGS. 8-10. Additionally or alternatively, some of these actions may be applied globally (e.g., control of volume, frequency distribution, and/or dynamic range).

As discussed below, a represented gesture may include actions other than or in addition to hand movements. For example, it may be desirable to implement method M100 to track a user's facial expression, head position and/or orientation, and/or gaze direction as well as hand movement and to alter the sound field (e.g., to steer a sound beam) accordingly.

Gesture interpretation task T200 may be context-dependent. For example, task T200 may be implemented to produce a command only in response to representations of gestures that are appropriate for the current context. In one such example, task T200 is implemented to ignore a representation of a gesture to reduce volume when the system is already in a muted state. In another such example, task T200 is implemented to ignore a representation of a blocking gesture when the system is already in a blocked state in that direction.

A mapping from a gesture representation to a corresponding command may also be context-dependent. For example, task T200 may be implemented to associate two or more different commands with the same gesture representation, depending on the context that exists when the gesture representation is received. Additionally or alternatively, the context may indicate whether the command is to be applied locally (e.g., only in the direction of the user) or globally.

Method M100 may be implemented to obtain the gesture representation from another operation or device. Alternatively, method M100 may be implemented to produce the representation of the gesture by performing an analysis of a captured scene. FIG. 7B shows a flowchart of an implementation M110 of method M100 that includes a scene analysis task TA10, which analyzes a captured scene to produce the representation of the gesture.

FIG. 7C shows a flowchart of an implementation M120 of method M110 that also includes a scene capture task TC10, which captures the scene that includes the gesture. Scene capture task TC10 may be implemented to use any one or more of various capture modalities (e.g., imaging and/or ranging) to record the scene. For example, task TC10 may be implemented to record an image or a sequence of images (e.g., a video sequence) that includes the gesture.

Such capture may include optical imaging by visible light and/or infrared (e.g., for image segmentation based on differences in color and/or luminance) and/or laser distance measurement. Task TC10 may be implemented to use a camera-based imaging system to capture a sequence of images, and task TA10 may be implemented to use image processing techniques to recognize objects and movements within that sequence. For example, task TC10 may be implemented to capture a sequence of images of a user within the sound field (e.g., using a webcam mounted in or on a personal computing device). With two or more cameras, tasks TC10 and TA10 may even be implemented to perform three-dimensional imaging and analysis, respectively (e.g., adding depth information on top of a two-dimensional recognition operation).

Additionally or alternatively, task TC10 may be implemented to perform such capture using ultrasound. In one such example, an array of ultrasound transducers is used to perform spatial imaging (e.g., by ranging). With a sufficient density of transducers in the ultrasound array, the resolution of such spatial imaging may be high enough to support identification of minute details. Additionally or alternatively, task TC10 may be implemented to capture movement information by using an ultrasonic Doppler technique (e.g., as described in U.S. Publ. Pat. Appl. No. 2010/0202656 A1 (Ramakrishnan et al.)).

Additionally or alternatively, task TC10 may be implemented to perform ranging using structured emission. For example, task TC10 may be implemented to perform ranging using structured emission of sound, such as spread-spectrum ultrasound (as described, e.g., in US Publ. Pat. Appl. No. 2012/0001875 A1 (Li et al., published Jan. 5, 2012)). Such ranging may be used to support depth imaging and/or depth segmentation of a captured scene.

In addition or in the alternative to using structured emission of sound, task TC10 may be implemented to use structured emission of light for distance mapping, depth imaging, and/or depth segmentation. Such an implementation may include projecting a known pattern (e.g., a periodic pattern of light, such as a pattern of stripes and/or dots) onto the scene and estimating the depths of surface points in the scene by capturing an image of the illuminated scene and determining a deformation of that pattern. Such an approach may use a laser (e.g., an infrared laser) to emit the light, a diffraction grating (e.g., a hologram) to impose the pattern on the emitted light, and an image detector to capture the image of the illuminated scene. In such case, task TA10 may be implemented to analyze an image of the projected pattern as reflected by objects in the field of view (e.g., as performed by the Kinect sensor, Microsoft, Redmond, Wash.).

Other capture approaches that may be used by capture task TC10 with (or instead of) any one or more of these capture modalities include use of a gesture glove and/or other controller, which may include tracking movement as indicated by an orientation sensor in the controller that indicates a current spatial orientation of the controller with reference to an external reference direction, such as a gravitational axis (e.g., an axis that is normal to the earth's surface) or a magnetic axis (e.g., the earth's magnetic axis). Such an orientation sensor may include one or more inertial sensors, such as gyroscopes and/or accelerometers. A gyroscope uses principles of angular momentum to detect changes in orientation about an axis or about each of two or three (typically orthogonal) axes (e.g., changes in pitch, roll and/or twist). Examples of gyroscopes, which may be fabricated as micro-electromechanical systems (MEMS) devices, include vibratory gyroscopes. An accelerometer detects acceleration along an axis or along each of two or three (typically orthogonal) axes and may be used to capture direction of movement. An accelerometer may also be fabricated as a MEMS device. It is also possible to combine a gyroscope and an accelerometer into a single sensor. Additionally or alternatively, the orientation sensor may include one or more magnetic field sensors (e.g., magnetometers), which measure magnetic field strength along an axis or along each of two or three (typically orthogonal) axes. In one example, the controller includes a magnetic field sensor that indicates a current orientation of the device relative to a magnetic axis (e.g., of the earth).

Scene analysis task TA10 analyzes the captured scene to produce the representation of the gesture. Such analysis of the captured scene may include one or more image analysis operations, such as image segmentation (e.g., by color and/or by depth), skin color detection, and/or background subtraction. Scene analysis task TA10 may also include one or more operations to detect changes over time, such as calculating difference images between adjacent frames of a video sequence.

Task TA10 may be implemented to perform one or more subtasks on the analyzed scene, such as feature extraction and feature classification. Feature extraction may include analyzing the captured scene to detect and locate regions of interest, such as the user's hand, fingers, head, face, eyes, body, and/or shoulders. Such analysis may also include identifying the orientations of detected features and/or changes over time (e.g., within a sequence of images), such as a trajectory of a hand or of each hand, a rotation and/or tilt of the head, etc.

Scene analysis by task TA10 may also include characterization of detected regions, such as calculating one or more moments (e.g., Hu invariant moments), calculating k-curvature (e.g., for fingertip detection), calculating geometric shape descriptors, and/or matching the region to one or more among a set of templates. Such analysis operations may include hand detection, convex hull for finger extraction, corner detection, convexity detection, skeleton registration for body part labeling, mapping to a skeletal model, and/or depth segmentation.

Figure 15:
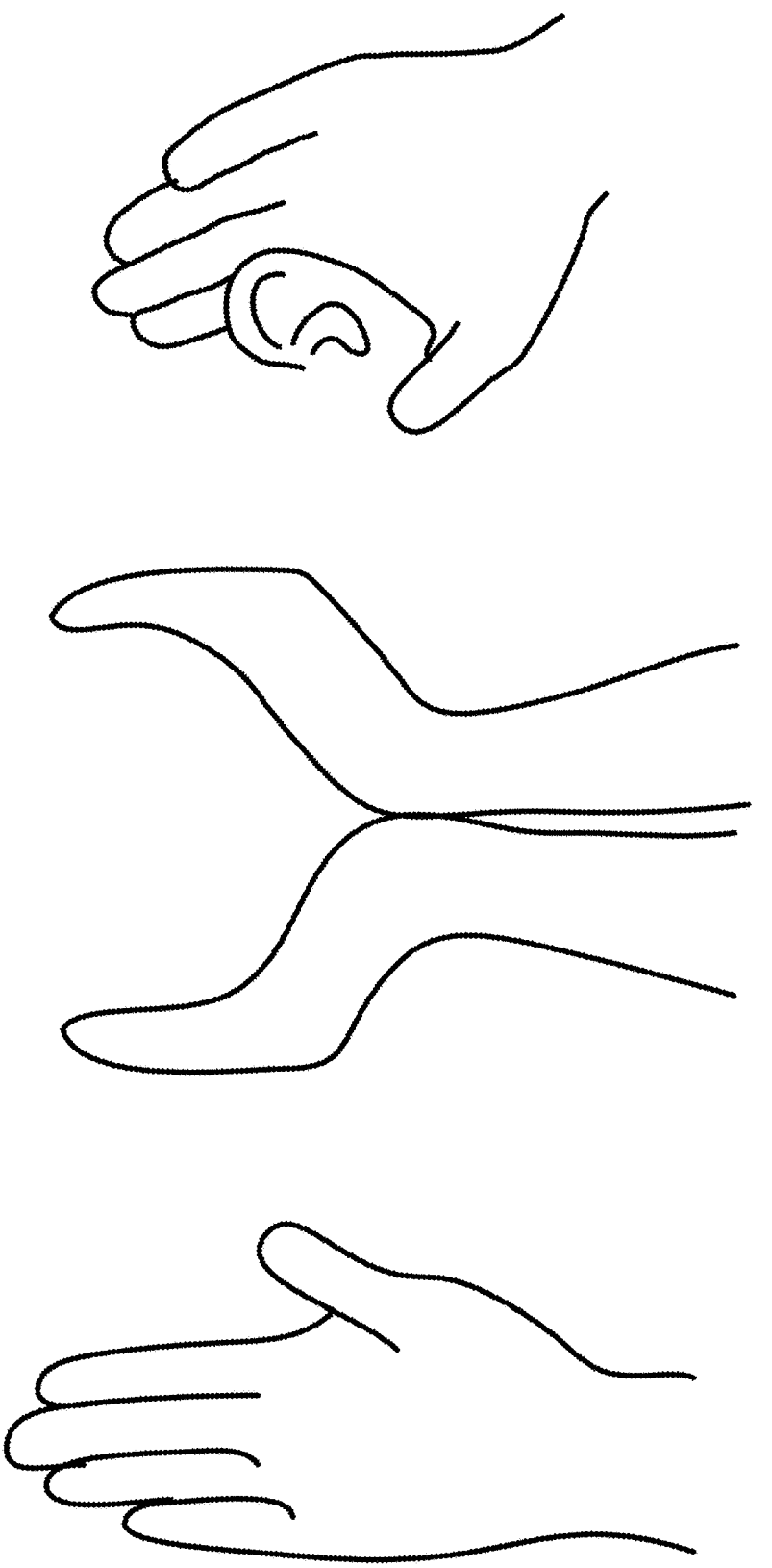
FIG. 15 shows three examples of gesture feature candidates.

Task TA10 may include feature classification, such as classifying a feature as the closest among a set of gesture feature candidates (e.g., according to the largest similarity measure), if a measure of the match (e.g., similarity measure) is above a threshold, which may be candidate-dependent. The one or more aspects of a feature may include, for example, one or more of shape, position (e.g., spatial relation of a user's hands to each other, and/or spatial relation of a user's hand to the user's face and/or eyes), distance (e.g., as detected by ranging and/or by a size of the detected feature), orientation (e.g., a tilt of the hand or head, a direction of pointing), and translation (e.g., movement left, right, up, and/or down). FIG. 15 shows three examples of gesture feature candidates.

Feature detection may also be based on past and/or future captures. For example, task TA10 may be implemented such that detection of a particular feature in a capture frame may be deemed more likely if the same feature is detected at a nearby location in an adjacent capture frame.

Task TA10 may be implemented to perform gesture recognition by selecting one or more among a plurality of candidate gesture representations. Such gesture recognition may include classifying a gesture as the closest among a set of gesture candidates (e.g., according to the largest similarity measure), if a measure of the match (e.g., similarity measure) is above a threshold, which may be candidate-dependent. Such classification may be based on a hidden Markov model or other pattern recognition algorithm to recognize a gesture element from individual features within a scene or frame and/or to recognize a sequence of gesture elements over time. Additional applications may include compound gestures (e.g., a sequence of two or more gestures) for menu navigation and/or user-interface feedback (e.g., via a sound and/or display icon) in response to a gesture recognition.

Task TA10 may be implemented to recognize a gesture as a sequence of gesture elements (e.g., detected features). Such a sequence may also include a particular movement of the gesture elements. As noted above, a hand gesture can be recognized with a camera and/or tracked with ultrasound arrays. For example, a gesture as shown in FIGS. 2A-2B may be characterized as the appearance of a raised open-palm-outward hand (which may be indicated by the inward position of the thumb with respect to, e.g., the user's face), and/or as a raised open-palm-outward hand whose size increases and/or whose distance decreases. Other examples of hand movement include clockwise or counter-clockwise rotation, lateral movement, vertical movement, movement toward or away from the sensor, and relative movement of the hands (e.g., hands moving in the same direction, hands moving toward/away from each other). Changes in hand shape may include grasping and releasing. A gesture may include at least one among a rotation of a head of a user and a lateral tilt of the head of the user (e.g., for control of dynamic range and/or volume).

Task TA10 may be implemented to recognize composite gestures (e.g., gestures that include a sequence of different elements presented over time) from the component gesture elements. The set of candidate gesture representations may also include two-hand, hand-and-head, and/or hand-and-body gestures, such as a gesture that includes a hand to the ear (e.g., one hand to the ear, and the other hand moved up/down or in/out to indicate a change in volume or dynamic range).

Task TA10 may be implemented to detect a particular gesture as a combination of an initial state of a gesture element combined with a change over time in one or more aspects of the element. A hidden Markov model may be used to match a sequence of observations to a sequence of gesture states (e.g., initial, intermediate, and terminal images of a sequence). Task TA10 may include tracking to verify that a gesture sequence is completed within a specified period (e.g., two to three seconds).

For at least some of the gestures to be represented, a scene analysis operation (e.g., task TA10) may include extracting an associated quantity from the captured scene. For example, such an operation may be implemented to quantify an extent to which a gesture element moves in the up/down, left-right, and/or approach/recede directions (e.g., relative to the sensor), or an extent of an initial separation and/or of a final separation between two moving gesture elements (e.g., the user's hands). Such quantification may be desirable, for example, to determine a value for each of one or more parameters of the corresponding action or actions. Such quantifiable parameters may include a volume, a location and/or bandwidth of a frequency range to be emphasized, a change in beam direction, a beam width, a dynamic range expansion or compression, an echo depth in time, etc.

Such a parameter value may be applied (e.g., by task T400) to adjust a level such as volume or dynamic range. In a first example, task TA10 determines the indicated quantity according to a distance relative to an initial position (e.g., of the hand). Such a hand gesture may include a pause of the hand to establish a base level, and task TA10 may be implemented to measure the distance of the final position of the hand in a direction relevant to the gesture (e.g., up/down, left/right, in/out). In a second example, task TA10 determines the indicated quantity according to a distance relative to a reference position. For example, a reference position of the user's hand may be established relative to the user's head. In one such example, a hand at chin level is associated with the middle value of the range, with the upper and lower limits being about 25-30 centimeters above and below that level, respectively. Such association with a reference may also be used for other configuration parameters. For example, a desired beam width may be indicated relative to a reference position of the hands held shoulder width apart, which is associated with the current beam width.

Alternatively, a range of a parameter (e.g., volume, beam width, dynamic range) may be determined as an estimated corresponding distance at the user's position. For example, task TA10 may be implemented to combine an observed distance or angle between the hands with the observed distance of the hands from the depth sensor to determine the corresponding distance between the hands at the user's position. Distance to the user may also be estimated from visual cues, such as head or hand size, shoulder span, etc.

In response to the command produced by gesture interpretation task T200, command interpretation task T300 produces a filter configuration. As discussed above, for example, the range of commands produced by task T200 may include any one or more of the following:

creating or deleting a sound beam in an indicated direction (e.g., relative to an axis of the directionally controllable transducer);

changing the width, volume, dynamic range, and/or direction (e.g., relative to an axis of the directionally controllable transducer) of a sound beam;

changing the energy distribution of a sound beam with respect to frequency (e.g., equalization or bass boosting);

creating or deleting a sound null in an indicated direction (e.g., relative to an axis of the directionally controllable transducer);

changing the width, depth, and/or direction (e.g., relative to an axis of the directionally controllable transducer) of a sound null; and locking or unlocking a current sound field configuration.

Additionally or alternatively, task T200 may produce a command to be applied to the entire sound field, such as control of volume, frequency distribution, and/or dynamic range.

Figure 16:
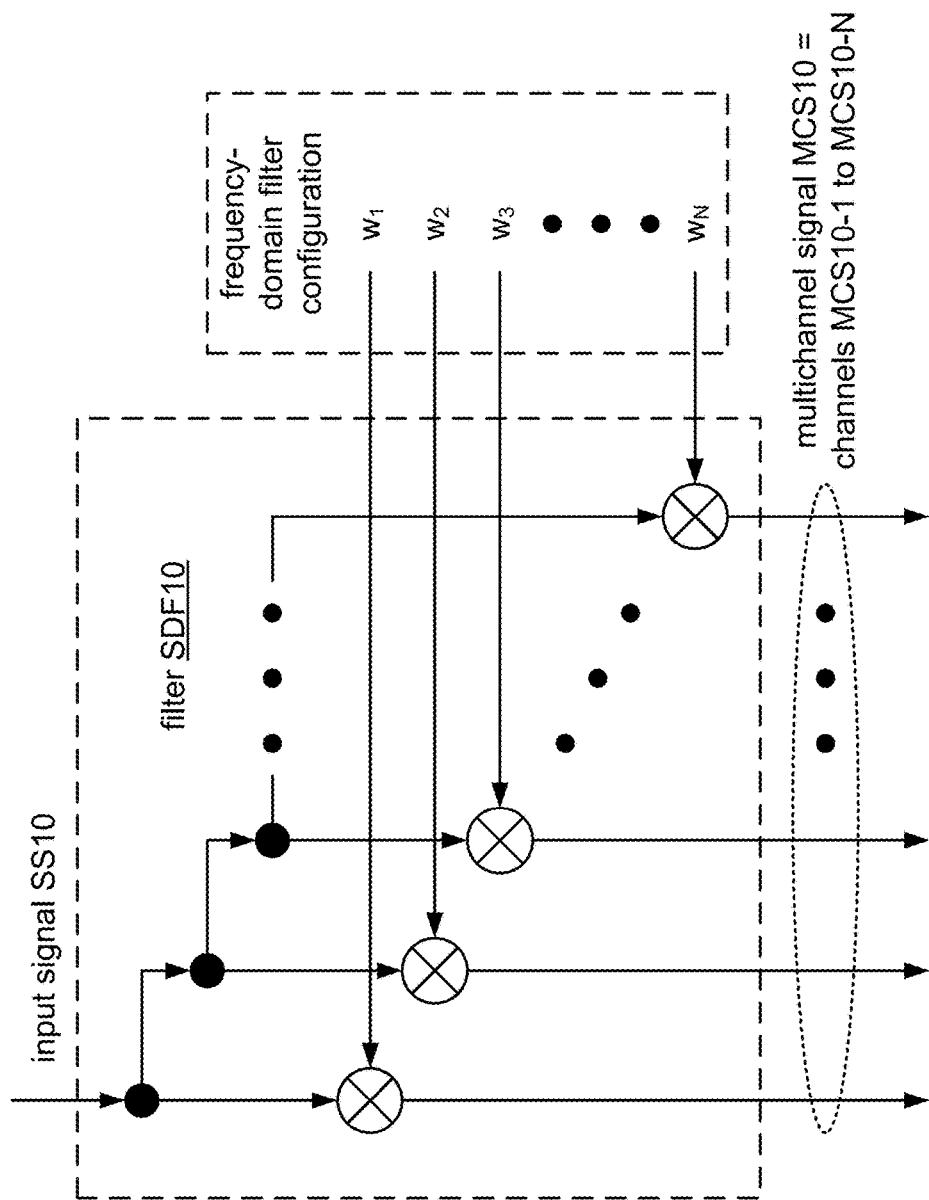
FIG. 16 shows a block diagram of a frequency-domain implementation SDF10 of a spatially directive filter configured by task T400.
Figure 17:
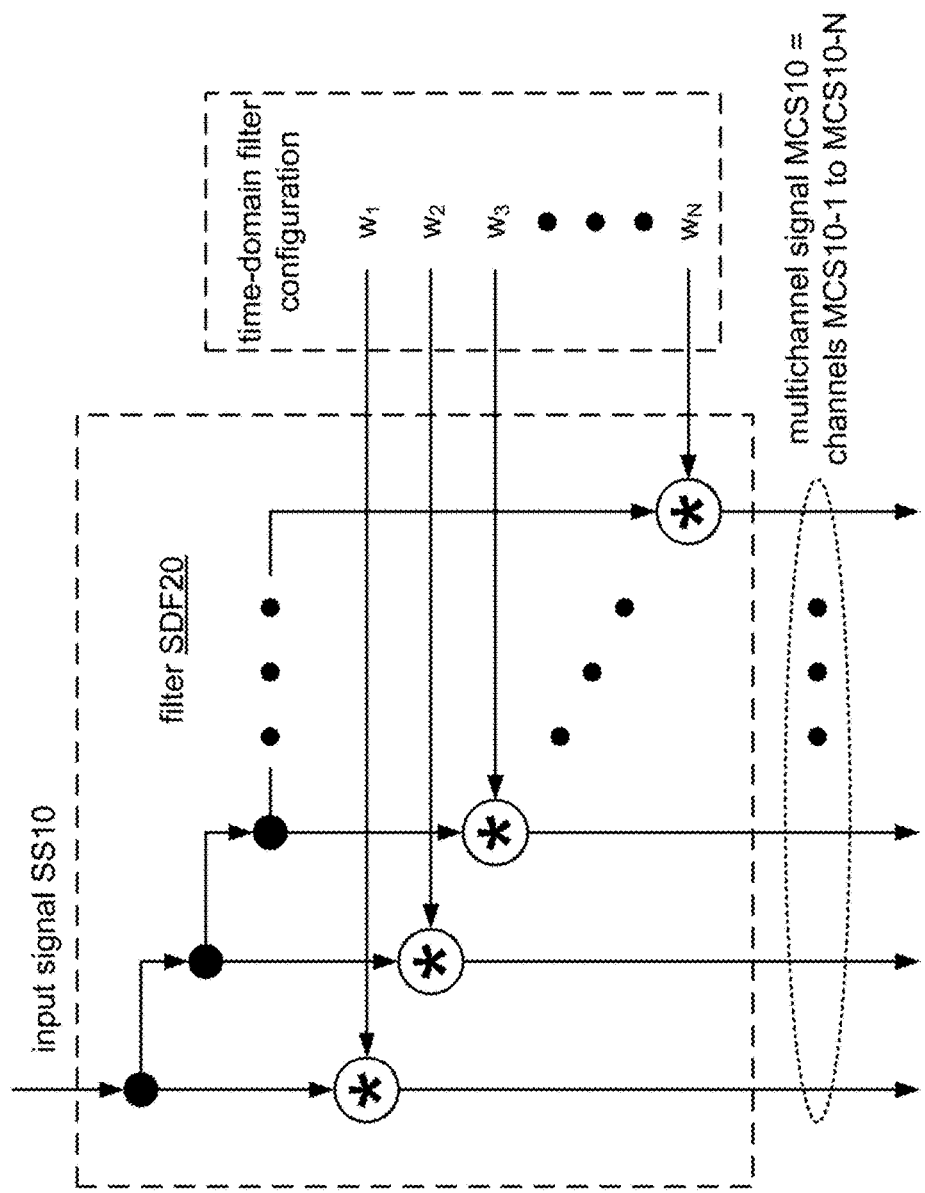
FIG. 17 shows a block diagram of an equivalent time-domain implementation SDF20 of the spatially directive filter.
Figure 18A:
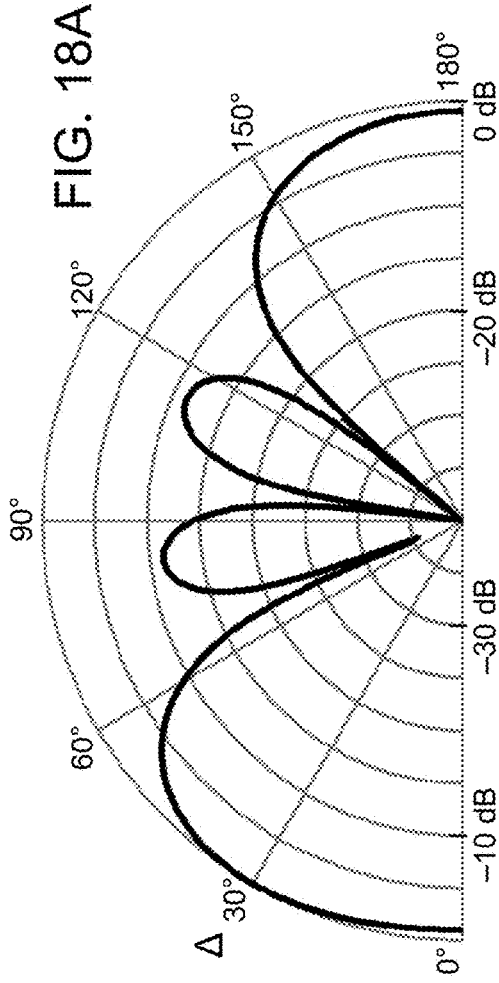
FIGS. 18A, 18B, 19A, and 19B show examples of the magnitude response with respect to direction of a DSB filter for a four-element array for four different orientation angles.
Figure 18B:
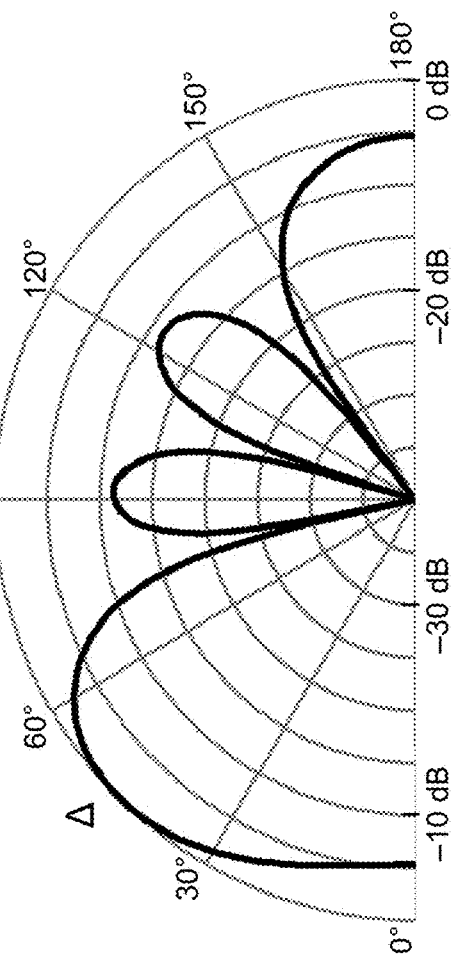

Signal synthesis task T400 produces a multichannel signal by applying a spatially directive filter that is based on the filter configuration to an input signal. FIG. 16 shows a block diagram of a frequency-domain implementation SDF10 of the spatially directive filter that is configured by task T400 to produce each channel MCS10-1 to MCS10-N of multichannel signal MCS10 as a product of input signal SS10 and a corresponding one of the coefficients $w_1$ to $w_N$ of the filter configuration. Such multiplications may be performed serially (i.e., one after another) and/or in parallel (i.e., two or more at one time). FIG. 17 shows a block diagram of an equivalent time-domain implementation SDF20 of the spatially directive filter that is configured by task T400 to produce each channel MCS10-1 to MCS10-N of multichannel signal MCS10 as a convolution of input signal SS10 and a corresponding one of sets $w_1$ to $w_N$ of filter coefficients of the filter configuration.

By weighting and/or delaying the input signal according to the filter configuration to generate each channel of the multichannel signal, such an implementation of task T400 may be used to obtain a desired spatial distribution of the produced sound field. For example, the spatially directive filter may be configured to produce the multichannel signal to induce constructive interference in a desired direction of a resulting sound field (e.g., in the direction of the beam) while inducing destructive interference in other directions of the sound field (e.g., in directions outside the mainlobe of the beam). As described below, the multichannel signal produced by such an implementation of task T400 may be used to drive a transducer to create a beam of acoustic energy that is concentrated in a desired direction and to create a valley in the beam response in other directions.

Task T300 may be implemented to produce the filter configuration according to a phased-array technique such that each channel of the multichannel signal has a respective phase (i.e., time) delay. One example of such a technique is a delay-sum beamforming (DSB) filter. In such case, the spatially directive filter may be configured to direct the sound field in a desired direction by applying a respective time delay to the input signal to produce each channel of signal MCS10. For a case in which the multichannel signal is used to drive a uniformly spaced linear loudspeaker array, for example, the coefficients of channels $w_1$ to $w_N$ of the spatially directive filter may be calculated according to the following expression for a DSB filtering operation in the frequency domain:

$$w_n = \frac{1}{N}\exp\left(-j\frac{2\pi f}{c}(n-1)d\cos\varphi_s\right), \quad (1)$$

for $1 \leq n \leq N$, where d is the spacing between the centers of the radiating surfaces of adjacent loudspeakers in the array, N is the number of loudspeakers to be driven (which may be less than or equal to the number of loudspeakers in the array), f is a frequency bin index, c is the velocity of sound, and $\varphi_s$ is the desired angle of the beam relative to the axis of the array (e.g., the desired direction of the main lobe of the sound field). For an equivalent time-domain implementation of the filter configuration, elements $w_1$ to $w_N$ may be implemented as corresponding delays. In either domain, task T400 may also include normalization of signal MCS10 by scaling each channel of signal MCS10 by a factor of 1/N (or, equivalently, scaling input signal SS10 by 1/N).

For a frequency $f_1$ at which the spacing d is equal to half of the wavelength $\lambda$ (where $\lambda = c/f_1$), expression (1) reduces to the following expression:

$$w_n = \frac{1}{N}\exp(-j\pi(n-1)\cos\varphi_s). \quad (2)$$

FIGS. 18A, 18B, 19A, and 19B show examples of the magnitude response with respect to direction (also called a beam pattern) of such a DSB filter at frequency $f_1$ for a four-element array, in which the orientation angle of the filter (i.e., angle $\varphi_s$, as indicated by the triangle in each figure) is thirty, forty-five, sixty, and seventy-five degrees, respectively.

It is noted that the filter beam patterns shown in FIGS. 18A, 18B, 19A, and 19B may differ at frequencies other than c/2d. To avoid spatial aliasing, it may be desirable to limit the maximum frequency of the input signal to c/2d (i.e., so that the spacing d is not more than half of the shortest wavelength of the signal). To direct a source component that includes high frequencies, it may be desirable to use a more closely spaced array.

It is also possible to implement task T400 to apply the spatially directive filter to produce multiple multichannel signals such that portions of a directionally selective transducer (e.g., subarrays of a loudspeaker array) may be driven differently for different frequency ranges. Such an implementation may provide better directivity for wideband reproduction. In one such example, task T400 is implemented to produce a second, N/2-channel multichannel signal (e.g., using alternate ones of the channels $w_1$ to $w_N$ of the spatially directive filter) from a frequency band of the input signal that is limited to a maximum frequency of c/4d, and this second multichannel signal is used to drive alternate loudspeakers of a loudspeaker array (i.e., a subarray that has an effective spacing of 2d).

It may be desirable to implement the filter configuration to apply different respective weights to channels of the multichannel signal. For example, it may be desirable for the filter configuration to include a spatial windowing function applied to the filter coefficients. Use of a spatial windowing function tends to reduce both sidelobe magnitude and angular resolution (e.g., by widening the mainlobe). Examples of such a windowing function include, without limitation, triangular and raised cosine (e.g., Hann or Hamming) windows.

In one example, task T300 is implemented to produce the filter configuration such that the coefficients of each channel $w_1$, of the source spatially directive filter include a respective factor $s_n$ of a spatial windowing function. In such case, expressions (1) and (2) may be modified to the following expressions, respectively:

$$w_n(f) = s_n \exp\left(-j\frac{2\pi f}{c}(n-1)d\cos\varphi_s\right); \quad (3a)$$

$$w_n = \frac{1}{N}s_n\exp(-j\pi(n-1)\cos\varphi_s). \quad (3b)$$

Figure 19A:
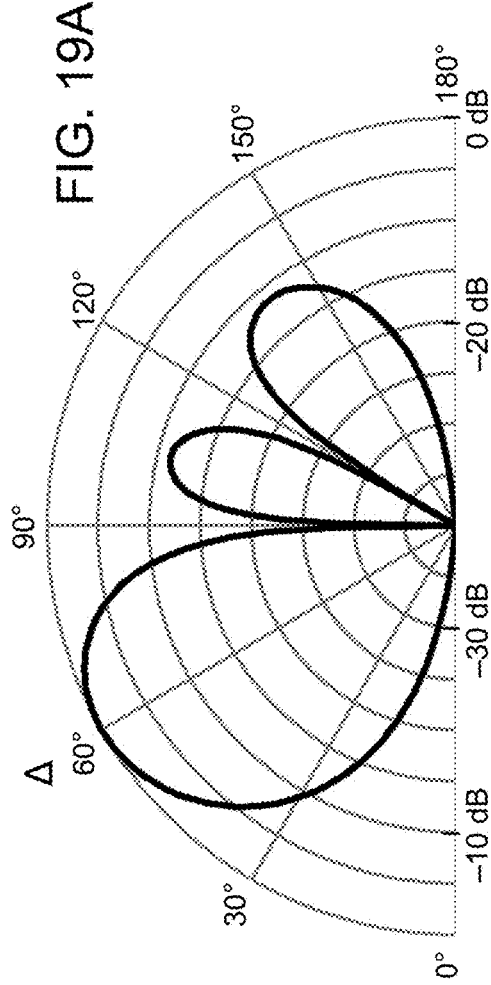
Figure 19B:
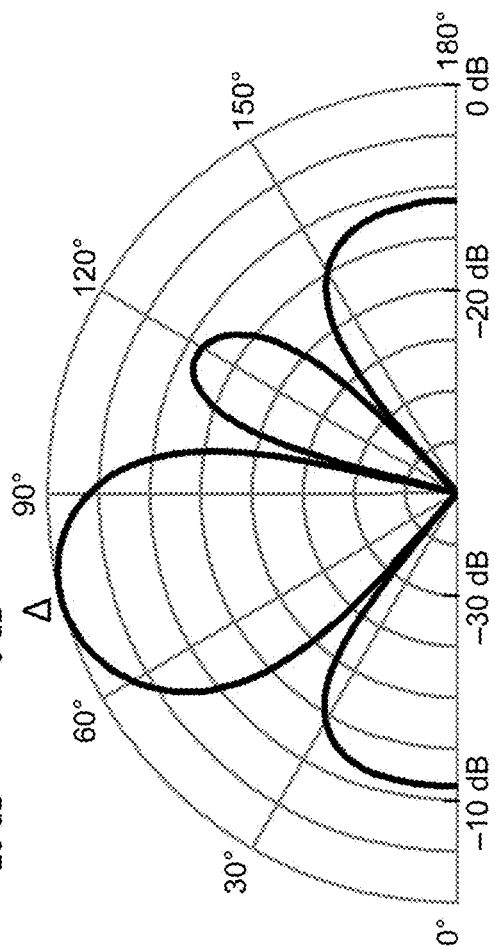

FIGS. 20A and 20B show examples of beam patterns at frequency $f_1$ for the four-element DSB filters of FIGS. 19A and 19B, respectively, according to such a modification in which the weights $s_1$ to $s_4$ have the values (2/3, 4/3, 4/3, 2/3), respectively.

Figure 21A:
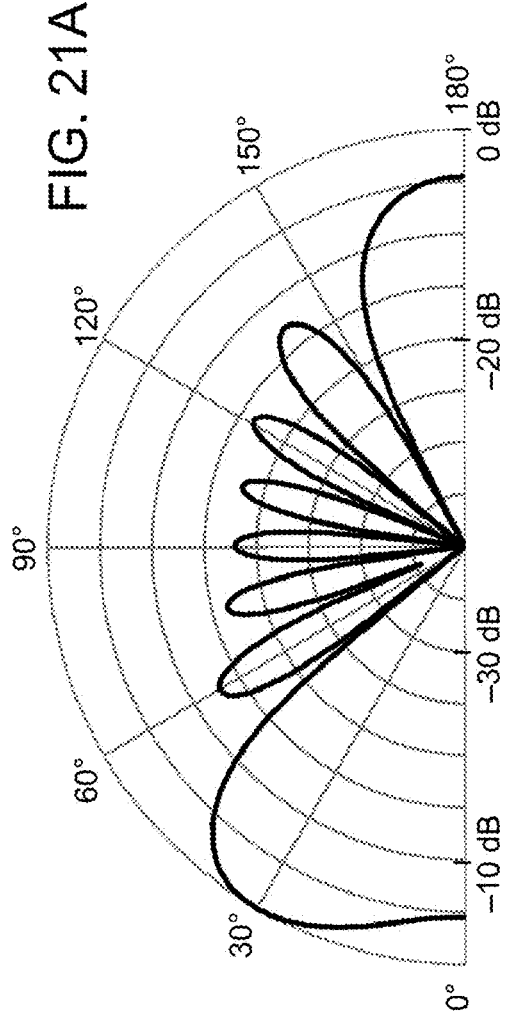
FIGS. 21A and 21B show examples of a beam pattern of a DSB filter for an eight-element array, in which the orientation angle of the filter is thirty and sixty degrees, respectively.
Figure 21B:
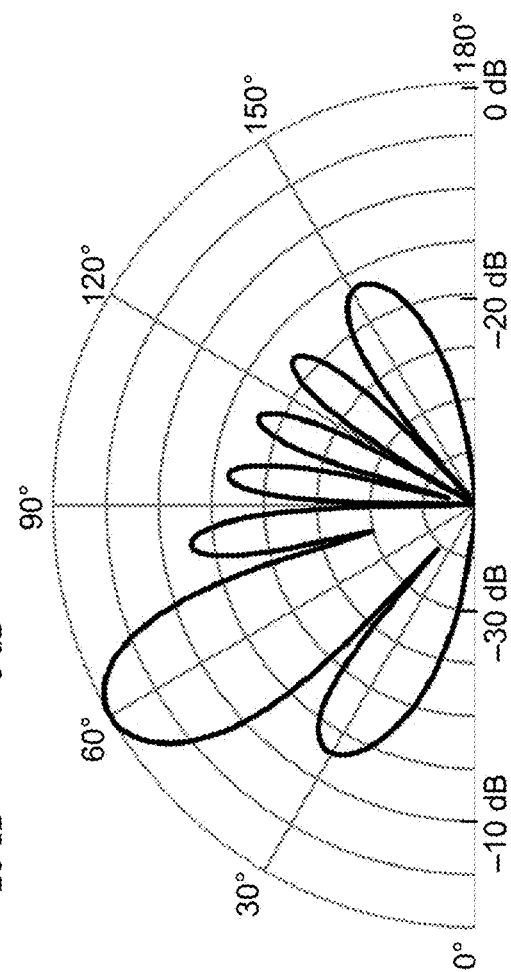
Figure 22A:
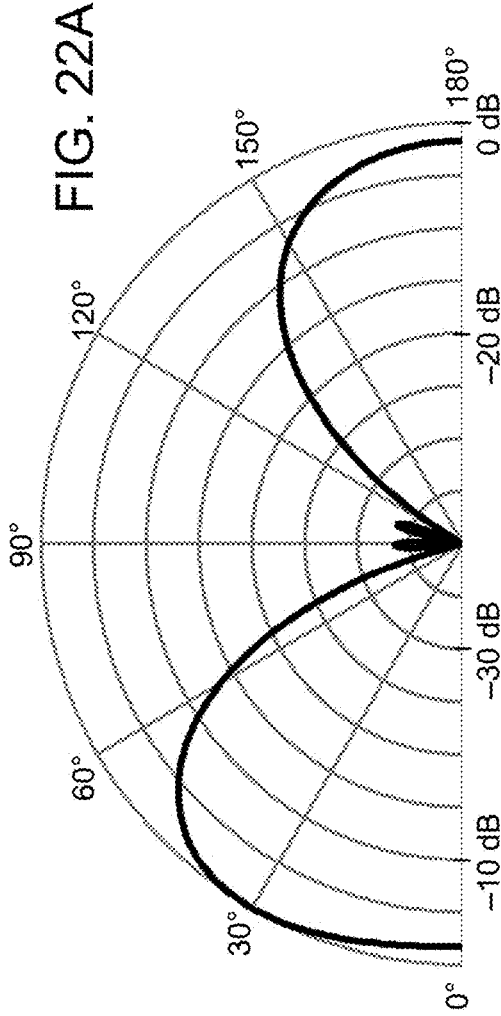
FIGS. 22A and 22B show examples of beam patterns for weighted modifications of the DSB filters of FIGS. 21A and 21B, respectively.
Figure 22B:
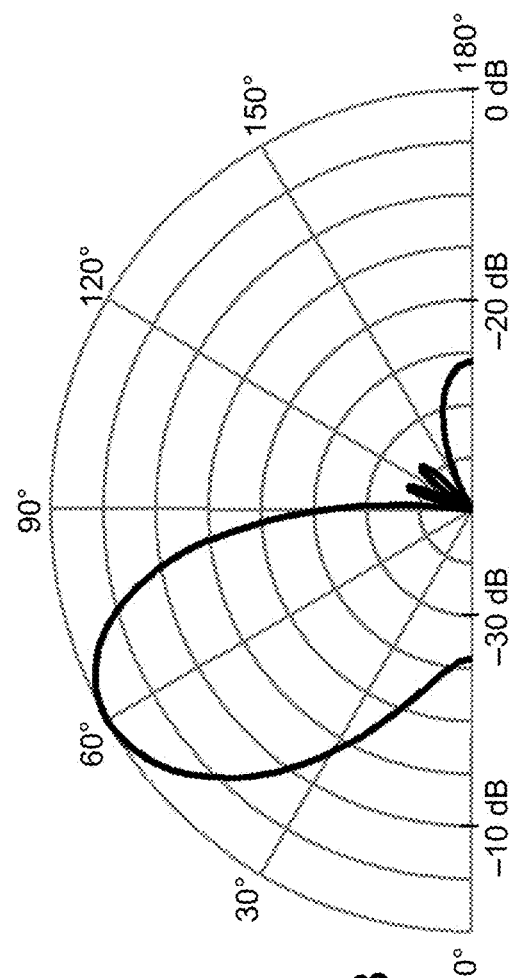

An array having more loudspeakers allows for more degrees of freedom and may typically be used to obtain a narrower mainlobe. FIGS. 21A and 21B show examples of a beam pattern of a DSB filter for an eight-element array, in which the orientation angle of the filter is thirty and sixty degrees, respectively. FIGS. 22A and 22B show examples of beam patterns for the eight-element DSB filters of FIGS. 21A and 21B, respectively, in which weights $s_1$ to $s_8$ as defined by the following Hamming windowing function are applied to the coefficients of the corresponding channels of the spatially directive filter:

$$s_n = 0.54 - 0.46\cos\left(\frac{2\pi(n-1)}{N-1}\right). \quad (4)$$

Task T300 may be implemented to produce the filter configuration by selecting an appropriate configuration from a set (e.g., a set of precalculated beam configurations), by direct calculation (e.g., according to any of expressions (1)-(4) above), and/or by modifying an existing filter configuration. The appropriate filter configuration for a particular command may vary depending on the current state or context of the system. For example, the appropriate filter configuration to be produced by task T300 may depend on a filter configuration currently being applied to the spatially directive filter by synthesis task T400. Accordingly, it may be desirable to implement task T300 to interpret the command in the context of the current sound field configuration to determine the appropriate filter configuration to produce.

The current context may include aspects such as the current direction, width, volume, dynamic range, and/or frequency distribution of a beam. Other aspects of the current context may include current overall levels of volume, dynamic range, and/or frequency distribution for the sound field; a location of the user (e.g., an angle relative to an axis of the transducer); and possibly a location of each of one or more other users.

It may be desirable to model the angular span of the target user environment as a number of discrete spatial sectors. FIGS. 23A and 23B show examples in which the space in front of a loudspeaker array R10 is divided into three spatial sectors and into five spatial sectors, respectively. The total numbers of spatial sectors in other examples of such a model include four, six, seven, eight, nine, and more. In such cases, task T300 may be implemented to produce a filter configuration that is associated with an indicated sector.

Figure 24:
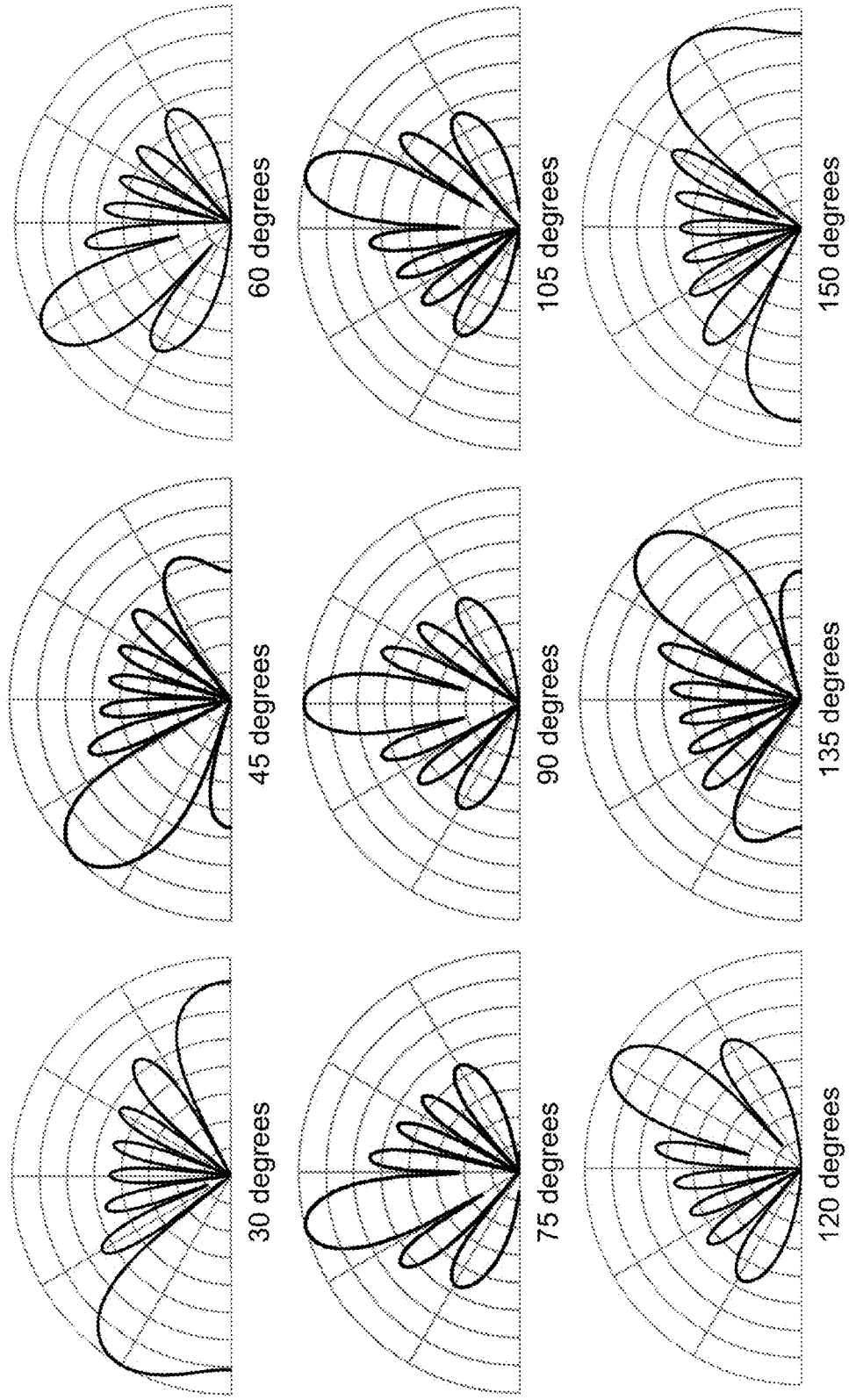
FIG. 24 shows beam patterns for a set of nine filter configurations.

FIG. 24 shows beam patterns for a set of nine filter configurations. The scale and orientation for each pattern in this figure is the same as for the patterns in FIGS. 18A-22B, and each pattern corresponds to an eight-channel DSB filter oriented at the indicated angle and driving a uniformly spaced linear array of loudspeakers. For an example in which the target span is divided into nine sectors centered at 30, 45, 60, 75, 90, 105, 120, 135, and 150 degrees, respectively, task T300 may be configured to produce the appropriate one of these filter configurations, with reference to the filter configuration currently being applied in the spatially directive filter, in response to a command to "move the beam to the left" or "move the beam to the right."

For an application in which the range of commands produced by task T200 includes commands to change the width of a sound beam, task T300 may be implemented to reference a table as shown in the example of FIG. 23C. In this table, the symbols "↓↓", "↓", "↑", and "↑↑" denote the commands "reduce beam width to minimum," "reduce beam width," "increase beam width," and "increase beam width to maximum." When the beam width of the filter configuration currently being applied in the spatially directive filter is narrow, task T300 determines that commands to reduce the beam width are invalid. Likewise, when the beam width of the filter configuration currently being applied in the spatially directive filter is wide, task T300 determines that commands to increase the beam width are invalid. Invalid commands may be ignored or may trigger an error indication (e.g., on a display screen). In other cases, task T300 produces a filter configuration to provide the desired beam width, with reference to the beam width associated with the filter configuration currently being applied in the spatially directive filter.

Figure 25:
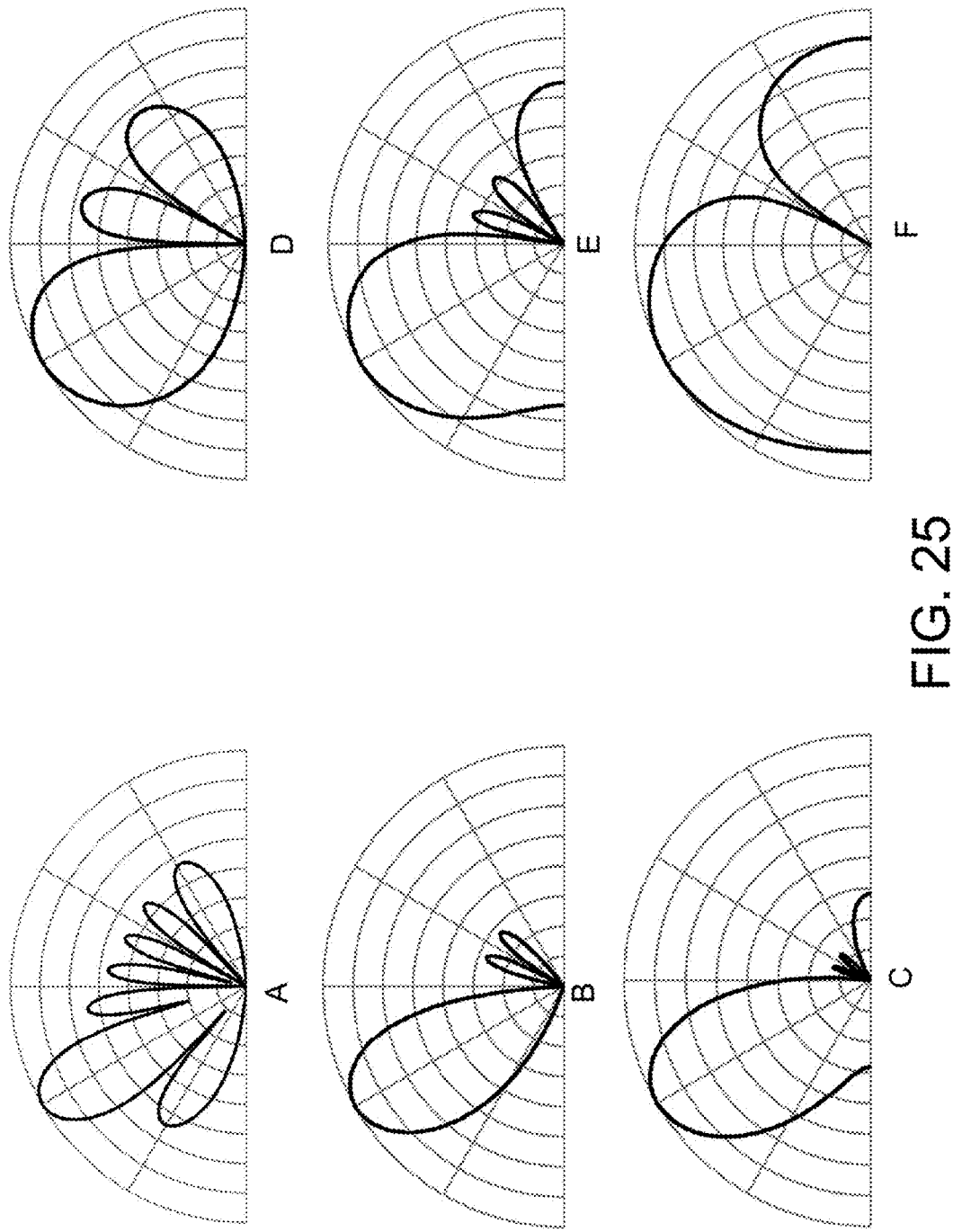
FIG. 25 shows beam patterns for a set of six filter configurations.

FIG. 25 shows beam patterns for a set of six filter configurations. The scale and orientation for each pattern in this figure is the same as for the patterns in FIGS. 18A-22B. Each of the patterns A-F corresponds to a DSB filter oriented at sixty degrees and driving a uniformly spaced linear array of loudspeakers, and the patterns are arranged in order of increasing beam width. For an example in which the current beam direction is sixty degrees, task T300 may be configured to produce the appropriate one of these filter configurations, with reference to the filter configuration currently being applied in the spatially directive filter, in response to a command to increase or decrease beam width. In this particular example, the patterns A-F correspond respectively to an eight-element DSB filter, an eight-element DSB filter with triangular window, an eight-element DSB filter with Hamming window, a four-element DSB filter (e.g., to drive alternate loudspeakers of an eight-element array), a four-element DSB filter with triangular window, and a four-element DSB filter with Hamming window.

It may be desirable to implement task T300 to produce filter configurations calculated according to a superdirective beamformer algorithm, which maximizes gain in a desired direction while minimizing the average gain over all other directions. Examples of superdirective beamformers include the minimum variance distortionless response (MVDR) beamformer (cross-covariance matrix), and the linearly constrained minimum variance (LCMV) beamformer. Other fixed or adaptive beamforming techniques, such as generalized sidelobe canceller (GSC) techniques, may also be used to calculate one or more of the filter configurations produced by task T300.

The design goal of an MVDR beamformer is to minimize the output signal power with the constraint $\min_W W^H \Phi_{XX} W$ subject to $W^H d=1$, where W denotes the filter coefficient matrix, $\Phi_{XX}$ denotes the normalized cross-power spectral density matrix of the loudspeaker signals, and d denotes the steering vector. Such a beam design may be expressed as $$W = \frac{(\Gamma_{VV} + \mu I)^{-1} d}{d^H (\Gamma_{VV} + \mu I)^{-1} d'}$$

where $d^T$ is a farfield model for linear arrays that may be expressed as $$d^T = [1, \exp(-j\Omega f_s c^{-1} \cos(\theta_0)), \exp(-j\Omega f_s c^{-1} 2l \cos(\theta_0)), \ldots, \exp(-j\Omega f_s c^{-1} (N-1) \cos(\theta_0))],$$

and $\Gamma_{V_n V_m}$ is a coherence matrix whose diagonal elements are 1 and which may be expressed as $$\Gamma_{V_n V_m} = \frac{\text{sinc}\left(\frac{\Omega f_s l_{nm}}{c}\right)}{1 + \frac{\sigma^2}{\Phi_{VV}}} \forall n \neq m.$$

In these equations, μ denotes a regularization parameter (e.g., a stability factor), $\theta_0$ denotes the beam direction, $f_s$ denotes the sampling rate, Ω denotes angular frequency of the signal, c denotes the speed of sound, l denotes the distance between the centers of the radiating surfaces of adjacent loudspeakers, $l_{nm}$ denotes the distance between the centers of the radiating surfaces of loudspeakers n and m, $\Phi_{VV}$ denotes the normalized cross-power spectral density matrix of the noise, and $\sigma^2$ denotes transducer noise power.

Tasks T300 and T400 may be implemented to produce a multichannel signal for use to drive a linear loudspeaker array with uniform spacing, a linear loudspeaker array with nonuniform spacing, or a nonlinear (e.g., shaped) array, such as an array having more than one axis. These tasks may also be implemented according to other directional field generation principles, such as a wave field synthesis (WFS) technique based on, e.g., the Huygens principle of wavefront propagation.

For implementations in which the loudspeaker array is non-linear, has nonuniform spacing, and/or has more than one axis, it may be desirable to implement task T300 to use a pairwise beamforming-nullforming (BFNF) configuration to calculate the filter coefficient values. Such a technique computes the coefficients on a pairwise basis, where a loudspeaker may be shared among two or more different pairs. The methods in FIGS. 26A-27 demonstrate BFNF techniques that may be applied independently at each frequency bin.

In this case, we augment the steering vector for each pair as shown in FIG. 26A, where λ is a conditioning factor. Each element of the steering vector for pair p and source n for beam direction $\theta_i$, frequency f, and loudspeaker number m (1 or 2 within the pair) may be calculated as $$d_{p,m}^n = \exp\left(\frac{-j\omega f_s(m-1)l_p}{c}\cos\theta_i\right),$$

where $l_p$ indicates the distance between the loudspeakers of pair p, ω indicates the frequency bin number, and $f_s$ indicates the sampling frequency. (This particular example also illustrates support for three sound fields, each based on a different input audio signal and concentrated in a different direction, which may be used to support gesture control as described herein independently for different users.) Using a pseudo-inverse operation as shown in FIG. 26A allows the use of a non-square matrix. For a three-loudspeaker case (i.e., two loudspeaker pairs) as illustrated in FIG. 26B, for example, the number of rows 2*2=4 instead of 3, such that the additional row makes the matrix non-square. As this approach is based on robust 1-D DOA estimation, complete knowledge of the array geometry is not required, and sound field direction estimation using all loudspeakers at the same time is also not required. FIG. 26C shows an example of the BFNF as shown in FIG. 26A which also includes normalization (e.g., to prevent an ill-conditioned inversion at the spatial aliasing frequency).

FIG. 27 shows an example of a pair-wise normalized MVDR (minimum variance distortionless response) BFNF, in which the manner in which the steering vector (array manifold vector) is obtained differs from the conventional approach. In this case, a common channel is eliminated due to sharing of a loudspeaker between the two pairs. The noise coherence matrix F may be obtained either by measurement or by theoretical calculation using a sinc function.

Method M100 may be implemented to include recognition of an initial gesture (e.g., grasp, rotate open hand) and/or voice command to enter a gesture control mode. Method M100 may be implemented to include face and/or voice recognition for user identification and/or location. Method M100 may include on-screen display (OSD) capability to provide feedback for the command produced by task T200 (e.g., a bar or dial to display a change in beam intensity, beam direction, beam width, dynamic range, etc.).

Method M100 may be implemented to include generating a masking signal. Such masking may be used with a sound-blocking gesture to obscure a blocked sound, for example, or with a beam-focusing gesture to mask the sound in other directions. The masking signal may be a noise signal, such as a white noise or pink noise signal. Alternatively, the masking signal may be a music signal or a noise signal whose frequency characteristics vary over time, such as a babble noise signal. Use of such an alternative masking signal may be less annoying to bystanders and/or less distracting to the user than a white or pink noise signal.

For a beam-focusing gesture, it may be desirable for method M100 to produce the sound field such that the spectrum of the sound field in directions other than the user's direction is noise-like (e.g., approximately white). For example, it may be desirable for the spectrum of the masking component to complement the spectrum of the source component.

For applications that include generation of a masking sound field (which may also be directional), a gesture may also be associated with a response to control one or more aspects of the masking field (e.g., creation, deletion, direction control, level control, and/or quality control of the masking sound field).

The generated sound field may include more than one beam (e.g., a superposition of two or more generated sound fields). For example, an instance of method M100 may be performed for each of two or more users, such that the respective multichannel signals produced by these instances are used to drive the same transducer.

FIG. 28A shows a block diagram of an apparatus A100 according to a general configuration that includes an audio output stage AO10, a gesture interpreter GI10, a command interpreter CI10, and a synthesizer SY10. Audio output stage AO10 is configured to drive a directionally controllable transducer to produce a beam (e.g., as described herein with reference to task T100). Gesture interpreter GI10 is configured to produce a command in response to a representation of a gesture (e.g., as described herein with reference to task T200). Command interpreter CI10 is configured to produce a filter configuration in response to the command (e.g., as described herein with reference to task T300). Synthesizer SY10 is configured to apply a spatially directive filter to an input signal to produce a multichannel signal, wherein the spatially directive filter is based on the filter configuration (e.g., as described herein with reference to task T400).

Gesture interpreter GI10 may be implemented to use the gesture representation as an index into a table that associates gesture representations with corresponding commands as described herein. At least some of the gesture representations may be accompanied by a parameter value that quantifies the indicated change as described herein. For any of the following gestures, for example, gesture interpreter GI10 may be implemented to receive an associated value for one or more parameters of the corresponding command: sound-blocking gesture—direction to block and/or degree of attenuation; muting gesture—degree of attenuation; beam-redirection gesture—destination direction and/or beam width; beam focus gesture—beam width; rising/falling hand gesture—degree of attenuation or amplification, frequency band to emphasize or attenuate; compression/expansion gesture—degree of compression or expansion.

Apparatus A100 may be implemented such that the sound field is concentrated in a direction that is automatically selected from among two or more fixed options as indicated by the recognized gesture. For example, apparatus A100 may be implemented such that the sound field is concentrated in a direction that corresponds to one among a left zone, a center zone, and a right zone. In such cases, apparatus A100 may be implemented such that a filter configuration that includes a set of factors (e.g., filter coefficients) for each direction to be selected is calculated offline (e.g., during design and/or manufacture) for selection by command interpreter CI10 and application by synthesizer SY10 to the source signal at run-time. One example of corresponding respective directions for the left, center, and right zones in such a case is (45, 90, 135) degrees. Other examples include, without limitation, (30, 90, 150) and (60, 90, 120) degrees. FIGS. 23A and 23B show examples of schemes having three and five selectable fixed spatial sectors, respectively. Such an implementation of command interpreter CI10 may be configured to select among different source beam widths for the selected direction according to an estimated user range. For example, a more narrow beam may be selected when the user is more distant from the array (e.g., to obtain a similar beam width at the user's position at different ranges).

FIG. 28B shows a block diagram of an implementation A110 of apparatus A100 that includes a scene analyzer SA10. Scene analyzer SA10 is configured to analyze a captured scene to produce the representation of the gesture (e.g., as described herein with reference to task TA10). For example, scene analyzer SA10 may be implemented to perform one or more image analysis operations on the captured scene, such as image segmentation, skin color detection, and/or background subtraction, and/or one or more operations to detect changes over time, such as calculating difference images between adjacent frames of a video sequence.

Scene analyzer SA10 may be implemented to perform one or more tasks, such as feature extraction and/or classification as described herein, on the analyzed scene. Scene analyzer SA10 may be implemented to detect a particular gesture as a combination of an initial state of a gesture element combined with a change over time in one or more aspects of the element as described herein. Scene analyzer SA10 may be implemented to classify a gesture as the closest among a set of gesture candidates as described herein.

FIG. 28C shows a block diagram of an implementation A120 of apparatus A110 that includes a capture device CD10 which captures the scene that includes the gesture (e.g., as described herein with reference to task TC10). Capture device CD10 is configured and arranged to record changes (e.g., movements) over time in the scene into which the sound field in produced. As discussed above, such a device may include, without limitation, one or more visible-light and/or infrared cameras, one or more ultrasonic transducers, and/or one or more structured light scanners. In one example, capture device CD10 includes a webcam of a portable computer (e.g., a laptop, desktop, notebook, or tablet computer). In another example, capture device CD10 includes a camera of a smartphone.

FIG. 28D shows a block diagram of an implementation A105 of apparatus A100 that includes a loudspeaker array R10. In this example, audio output stage AO10 is also arranged to produce driving signals, based on corresponding channels of the multichannel signal produced by synthesizer SY10, to drive loudspeaker array R10 (or another directionally selective transducer).

Synthesizer SY10 may also be implemented to perform one or more other audio processing operations on the input signal to produce the driving signals. Such operations may include amplifying and/or filtering one or more (possibly all) of the channels. Similarly, it may be desirable to implement audio output stage AO10 to apply an inverse filter to the multichannel signal to compensate for differences in the array response at different frequencies and/or to implement audio output stage AO10 to compensate for differences between the responses of the various loudspeakers of the array. Alternatively or additionally, it may be desirable to implement audio output stage AO10 to provide impedance matching to the loudspeaker array (and/or to an audio-frequency transmission path that leads to the loudspeaker array).

For some gestures, it may be desirable for apparatus A100 to adjust a parameter (e.g., volume, dynamic range, and/or frequency distribution) in a spatially focused manner. For other gestures, it may be desirable for apparatus A100 to adjust such a parameter across the entire sound field. FIG. 23D shows a block diagram of an implementation SY20 of synthesizer SY10 that may be used to support such adjustments both globally and locally. Synthesizer SY20 includes a single-channel filter SCF10 that is configured to adjust one or more parameters of the input audio signal (e.g., volume, dynamic range, frequency distribution). Such an adjustment may be performed according to a configuration (e.g., one or more filter coefficients) provided by command interpreter CI10. Synthesizer SY20 also includes an instance of spatially directive filter SDF10 (or SDF20) as described herein, which receives the signal produced by filter SCF10 and produces a corresponding multichannel driving signal as described herein (e.g., with reference to task T400).

FIG. 29A shows a block diagram of an apparatus MF100 according to a general configuration. Apparatus MF100 includes means F100 for driving a directionally controllable transducer to produce a beam (e.g., as described herein with reference to task T100). Apparatus MF100 also includes means F200 for producing a command in response to a representation of a gesture (e.g., as described herein with reference to task T200), wherein the gesture indicates a change in at least one among a direction of the beam and a width of the beam, and wherein the command is a command to perform the indicated change. Apparatus MF100 also includes means F300 for producing a filter configuration in response to said command (e.g., as described herein with reference to task T300). Apparatus MF100 also includes means F400 for performing a spatially directive filtering operation on an input signal to produce a multichannel signal, wherein the spatially directive filtering operation is based on the filter configuration (e.g., as described herein with reference to task T400).

FIG. 29B shows a block diagram of an implementation MF110 of apparatus MF100 that includes means FA100 for analyzing a captured scene to produce the gesture representation (e.g., as described herein with reference to task TA10). FIG. 29B shows a block diagram of an implementation MF120 of apparatus MF110 that includes means FC100 for capturing the scene that includes the gesture (e.g., as described herein with reference to task TC10).

Figure 30:
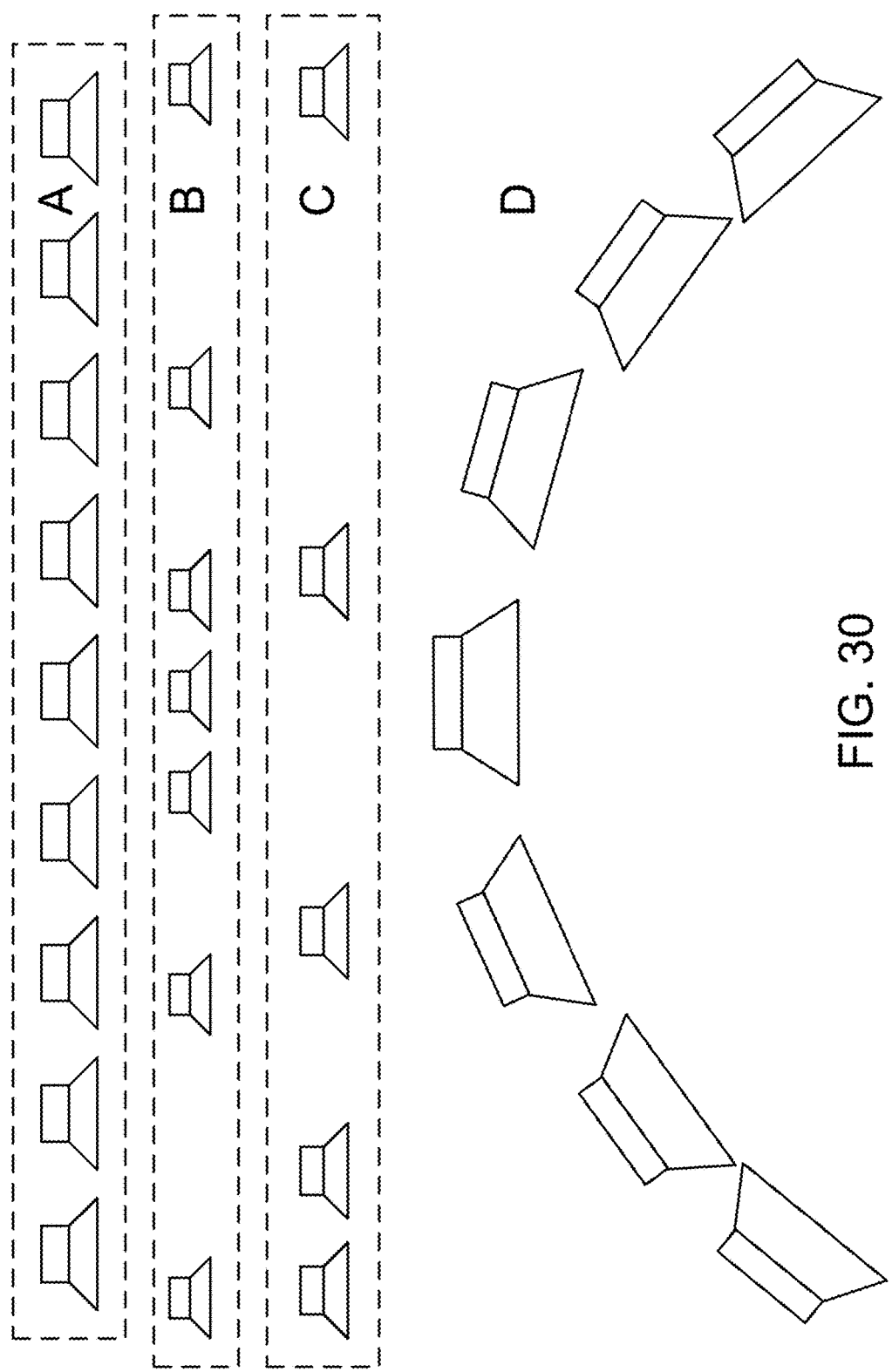
FIG. 30A shows a uniform linear array of loudspeakers.
FIG. 30B shows one example of a uniform linear array having symmetrical octave spacing between the loudspeakers.
FIG. 30C shows an example of a uniform linear array having asymmetrical octave spacing.
FIG. 30D shows an example of a curved array having uniform spacing.

It is expressly noted that the principles described herein are not limited to use with a uniform linear array of loudspeakers (e.g., as shown in FIGS. 1C, 1D, and 30A). For example, directional masking may also be used with a linear array having a nonuniform spacing between adjacent loudspeakers. FIG. 30B shows one example of such an array having symmetrical octave spacing between the loudspeakers, and FIG. 30C shows another example of such an array having asymmetrical octave spacing. Additionally, such principles are not limited to use with linear arrays and may also be used with arrays whose elements are arranged along a simple curve, whether with uniform spacing (e.g., as shown in FIG. 30D) or with nonuniform (e.g., octave) spacing. The same principles stated herein also apply separably to each array in applications having multiple arrays along the same or different (e.g., orthogonal) straight or curved axes.

Figure 31B:
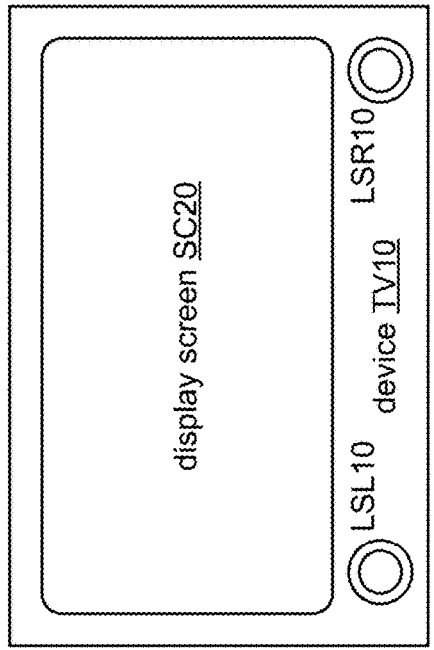
FIG. 31B shows a display device TV10.
Figure 31C:
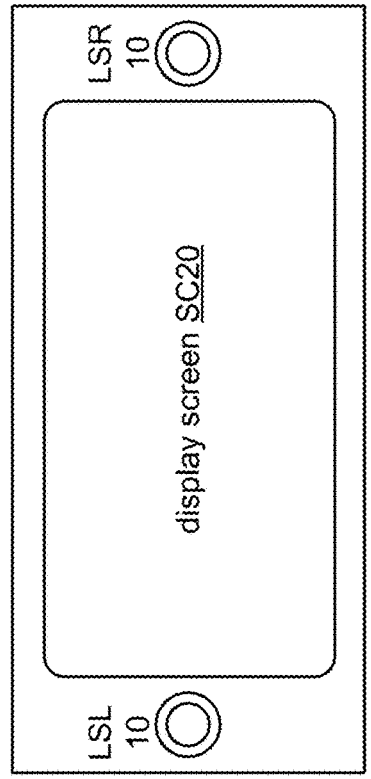
FIG. 31C shows a display device TV20.
Figure 31A:
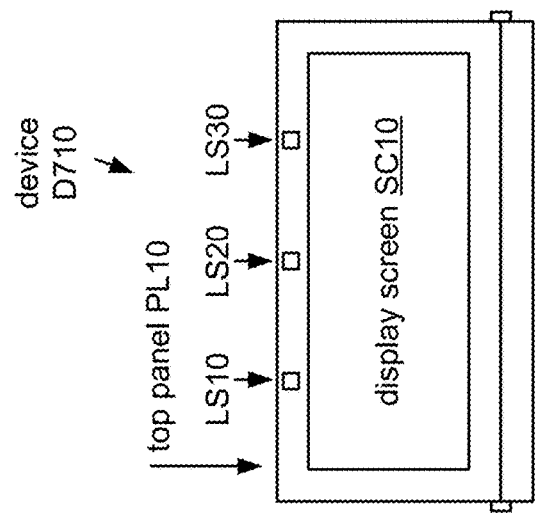
FIG. 31A shows a laptop computer D710.

FIG. 31B shows an example of an array of loudspeakers LSL10-LSR10 to be driven by an implementation of apparatus A100. In this example, the array is arranged below a display screen SC20 in a display device TV10 (e.g., a television or computer monitor). FIG. 31C shows an example of array LSL10-LSR10 on either side of display screen SC20 in such a display device TV20. FIG. 31A shows a laptop computer D710 that includes an array of three loudspeakers LS10, LS20, LS30 driven by an implementation of apparatus A100. A laptop computer D710 as shown in FIG. 31A may also be configured to include such an array (e.g., in behind and/or beside a keyboard in bottom panel PL20 and/or in the margin of display screen SC10 in top panel PL10). Such a loudspeaker array may also be enclosed in one or more separate cabinets or installed in the interior of a vehicle such as an automobile.

In the example of a linear array, it may be expected that the main beam directed at zero degrees in the frontal direction will also be audible in the back direction (e.g., at 180 degrees). Such a phenomenon, which is common in the context of a linear array of loudspeakers or microphones, is also referred to as a "cone of confusion" problem.

Figure 32B:
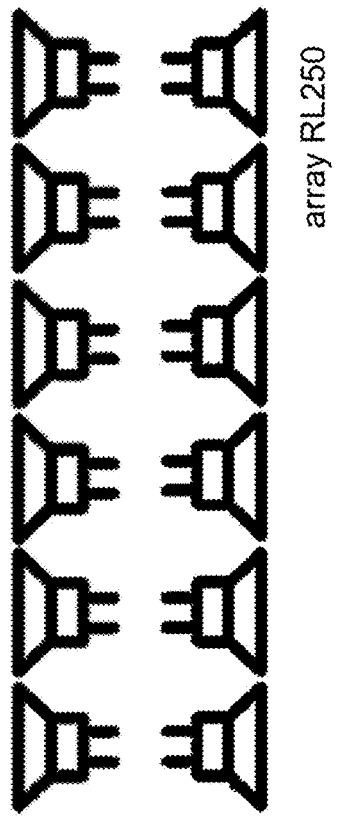
FIGS. 32A and 32B show top views of two examples of an expanded array.
Figure 32C:
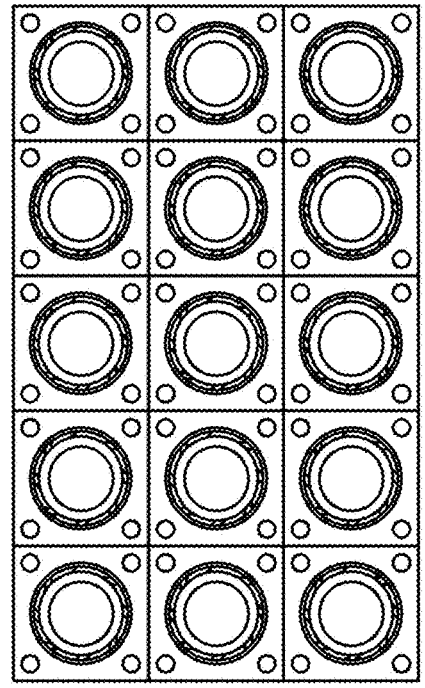
FIGS. 32C and 33 show front views of two different arrays.
Figure 32A:
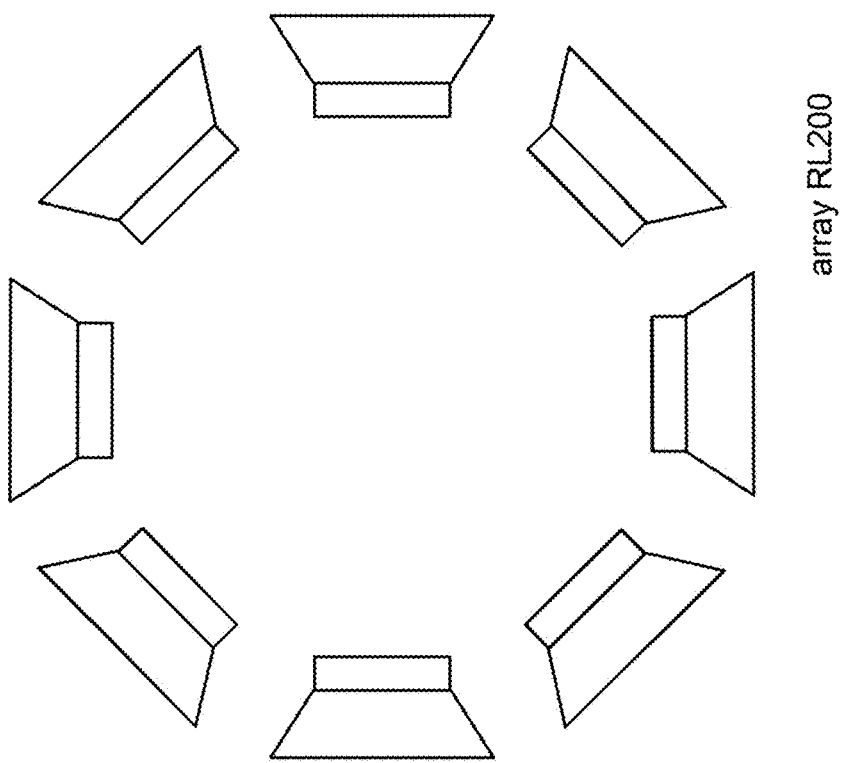

Although particular examples of directional sound field generation in a range of 180 degrees are shown, the principles described herein may be extended to provide directivity across any desired angular range in a plane (e.g., in two dimensions). Such extension may include the addition of appropriately placed loudspeakers to the array. For example, it may be desirable to add loudspeakers to an array to provide a front-back array for masking in a front-back direction as well. FIGS. 32A and 32B show top views of two examples RL200 and RL250, respectively, of such an expanded array.

Figure 33:
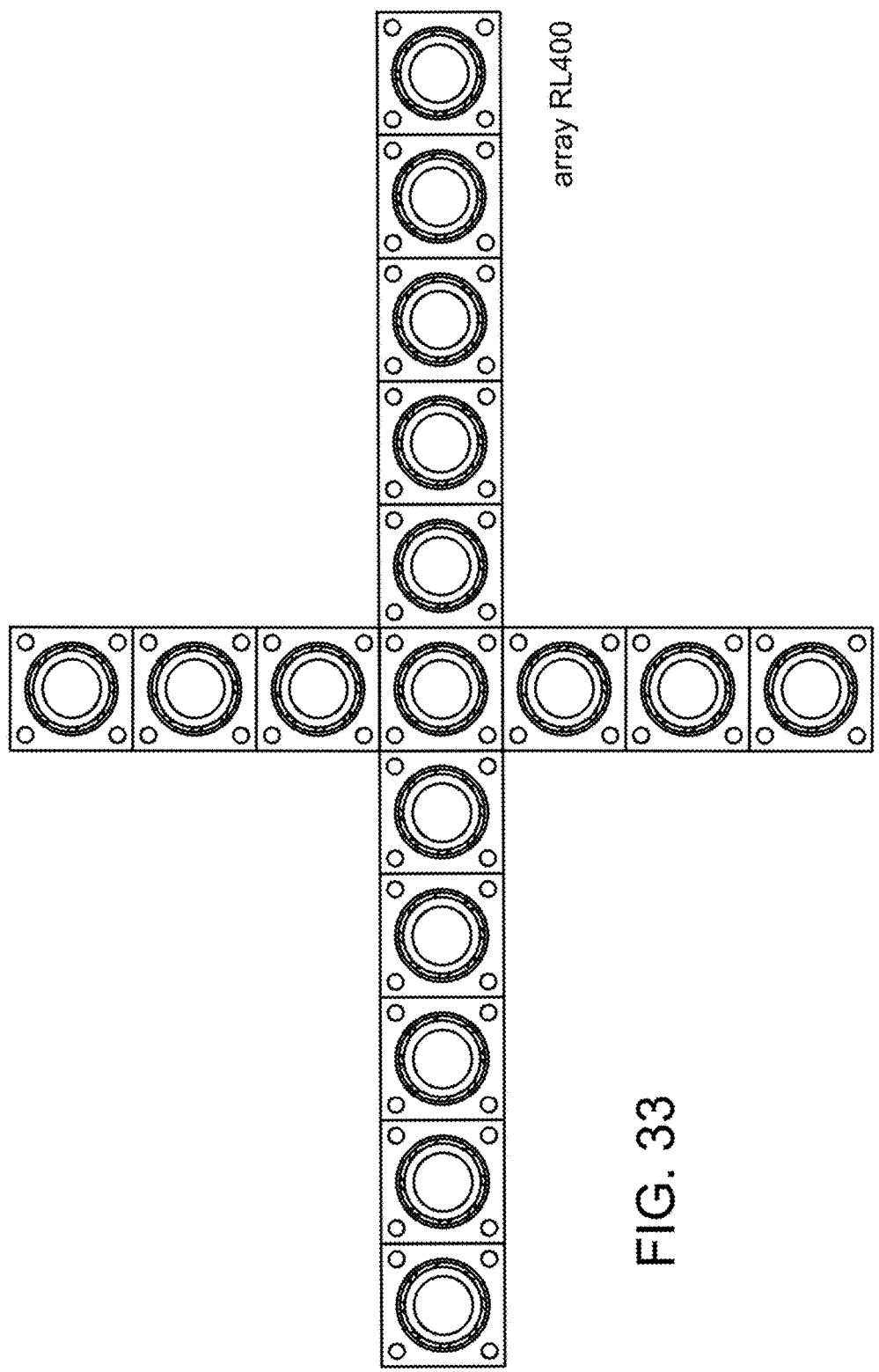

Such principles may also be extended to provide directional masking across any desired angular range in space (3D). FIGS. 32C and 33 show front views of two arrays RL300 and RL400, respectively, that may be used to provide directional masking in both left-right and up-down directions. Further examples include spherical or other 3D arrays for directional masking in a range up to 360 degrees (e.g., for a complete privacy zone of 4*pi radians).

When beamforming techniques are used to produce spatial patterns for broadband signals, selection of the transducer array geometry involves a trade-off between low and high frequencies. To enhance the direct handling of low frequencies by the beamformer, a larger loudspeaker spacing is preferred. At the same time, if the spacing between loudspeakers is too large, the ability of the array to reproduce the desired effects at high frequencies will be limited by a lower aliasing threshold. To avoid spatial aliasing, the wavelength of the highest frequency component to be reproduced by the array should be greater than twice the distance between adjacent loudspeakers.

As consumer devices become smaller and smaller, the form factor may constrain the placement of loudspeaker arrays. For example, it may be desirable for a laptop, netbook, or tablet computer or a high-definition video display to have a built-in loudspeaker array. Due to the size constraints, the loudspeakers may be small and unable to reproduce a desired bass region. Alternatively, loudspeakers having an increased cone distance large enough to reproduce the bass region may be used. In a small form-factor device, however, such physically larger loudspeakers may still be spaced too closely to support beamforming or other acoustic imaging at low frequencies. Additionally, the increased cone distance of these larger loudspeakers may actually decrease beamforming quality for high-frequency content. Thus it may be desirable to provide the processing to produce a bass signal in a closely spaced loudspeaker array in which beamforming is employed.

A psychoacoustic phenomenon exists that listening to higher harmonics of a signal may create a perceptual illusion of hearing the missing fundamentals. Thus, one way to achieve a sensation of bass components from small loudspeakers is to generate higher harmonics from the bass components and play back the harmonics instead of the actual bass components. Descriptions of algorithms for substituting higher harmonics to achieve a psychoacoustic sensation of bass without an actual low-frequency signal presence (also called "psychoacoustic bass enhancement" or PBE) may be found, for example, in U.S. Pat. No. 5,930,373 (Shashoua et al., issued Jul. 27, 1999) and U.S. Publ. Pat. Appls. Nos. 2006/0159283 A1 (Mathew et al., published Jul. 20, 2006), 2009/0147963 A1 (Smith, published Jun. 11, 2009), and 2010/0158272 A1 (Vickers, published Jun. 24, 2010). Such enhancement may be particularly useful for reproducing low-frequency sounds with devices that have form factors which restrict the integrated loudspeaker or loudspeakers to be physically small.

Figure 34:
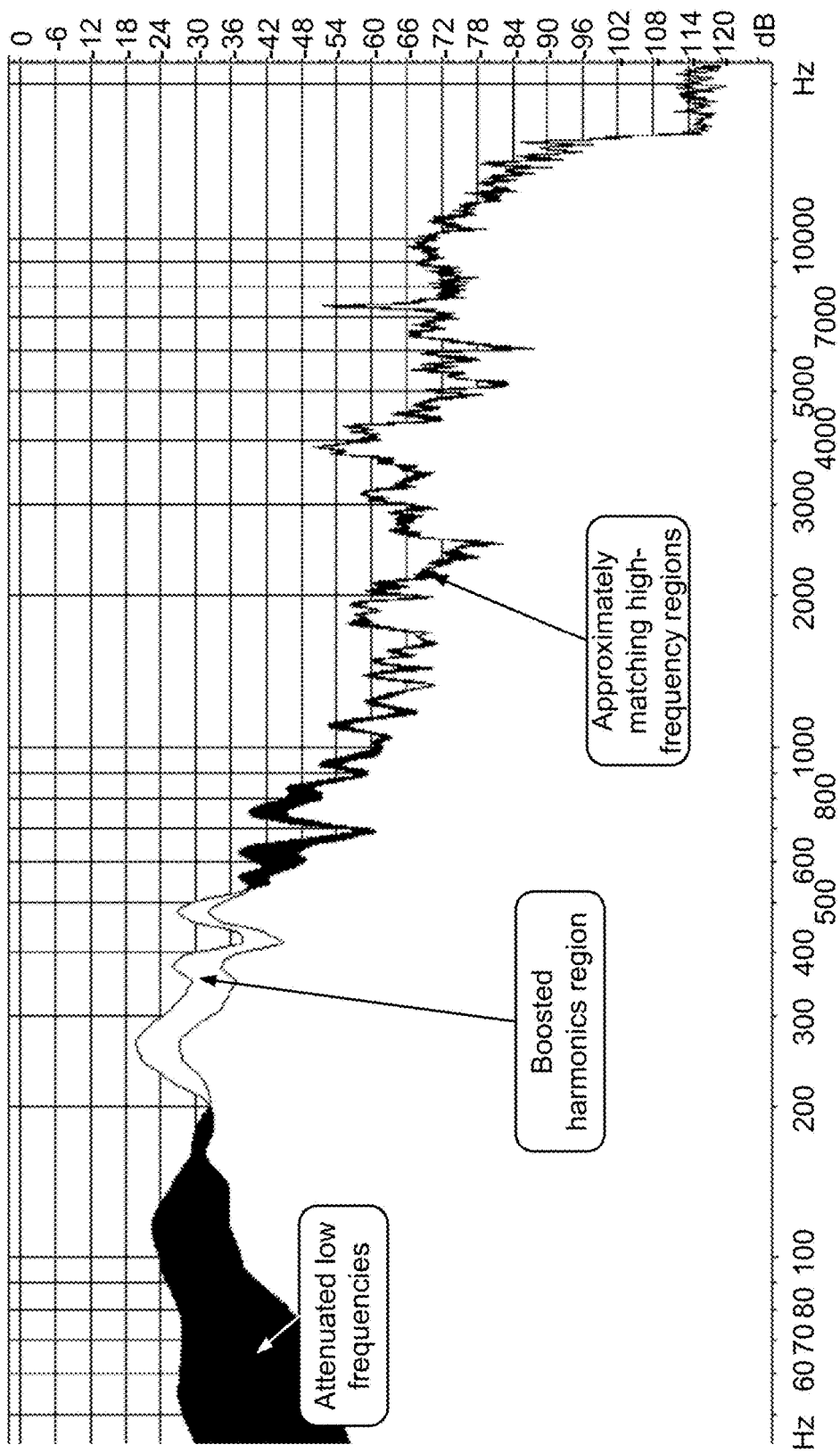
FIG. 34 shows an example of a frequency spectrum of a music signal before and after PBE processing.

FIG. 34 shows an example of a frequency spectrum of a music signal before and after PBE processing. In this figure, the background (black) region and the line visible at about 200 to 500 Hz indicates the original signal, and the foreground (white) region indicates the enhanced signal. It may be seen that in the low-frequency band (e.g., below 200 Hz), the PBE operation attenuates around 10 dB of the actual bass. Because of the enhanced higher harmonics from about 200 Hz to 600 Hz, however, when the enhanced music signal is reproduced using a small speaker, it is perceived to have more bass than the original signal.

It may be desirable to apply PBE not only to reduce the effect of low-frequency reproducibility limits, but also to reduce the effect of directivity loss at low frequencies. For example, it may be desirable to combine PBE with beamforming to create the perception of low-frequency content in a range that is steerable by a beamformer. The use of a loudspeaker array to produce directional beams from an enhanced signal results in an output that has a much lower perceived frequency range than an output from the audio signal without such enhancement. Additionally, it becomes possible to use a more relaxed beamformer design to steer the enhanced signal, which may support a reduction of artifacts and/or computational complexity and allow more efficient steering of bass components with arrays of small loudspeakers. At the same time, such a system can protect small loudspeakers from damage by low-frequency signals (e.g., rumble). Additional description of such enhancement techniques, which may be combined with gestural soundfield control as described herein, may be found in, e.g., U.S. Publ. Pat. Appl. No. 2012/0020480 A1, entitled "SYSTEMS, METHODS, AND APPARATUS FOR ENHANCED ACOUSTIC IMAGING" (Visser et al., published Jan. 26, 2012).

The methods and apparatus disclosed herein may be applied generally in any transceiving and/or audio sensing application, including mobile or otherwise portable instances of such applications and/or sensing of signal components from far-field sources. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., apparatus A100, A105, A110, A120, MF100, MF110, and MF120) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of the elements of the apparatus may be implemented within the same array or arrays. Such an array or arrays may be implemented within one or more chips (for example, within a chipset including two or more chips).

One or more elements of the various implementations of the apparatus disclosed herein may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a gesture-control procedure as described herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., methods M100, M110, M120, and implementations thereof) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers.

Combinations of the above should also be included within the scope of computer-readable media.

An acoustic signal processing apparatus as described herein (e.g., apparatus A100, A105, A110, A120, MF100, MF110, or MF120) may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A method of signal processing, said method comprising:
   producing a command in response to a representation of a hand gesture of a user, wherein the hand gesture indicates (i) a change to a sound field near the user and (ii) a direction of where to direct the sound field, wherein the sound field comprises a beam;
   producing a filter configuration for a spatially directive filter in response to said command based on a current filter configuration;
   applying the spatially directive filter to a multichannel signal; and
   driving an array of directionally controllable transducers with the multichannel signal to change the sound field that includes the beam.

2. The method of signal processing according to claim 1, wherein said producing the command comprises selecting the command, based on information from said representation, from among a plurality of commands that includes (A) a command to increase a width of the beam and (B) a command to decrease the width of the beam.

3. A method of signal processing according to claim 1, wherein said producing the command comprises selecting the command, based on information from said representation, from among a plurality of commands that includes (A) a command to change a current direction of the beam to a first direction that is on a first side of the beam and (B) a command to change the current direction of the beam to a second direction that is on a second side of the beam opposite to the first side.

4. A method of signal processing according to claim 1, wherein said producing the filter configuration is based on an indication of at least one among a current direction of the beam and a current width of the beam.

5. A method of signal processing according to claim 1, wherein said producing the filter configuration is based on an indication of a current location of a user.

6. A method of signal processing according to claim 1, wherein said producing the filter configuration comprises selecting the filter configuration, according to said command, from among a plurality of filter configurations.

7. The method of signal processing according to claim 6, wherein a first filter configuration among the plurality of filter configurations describes a different phase relation among output channels of the spatially directive filter than a second filter configuration among the plurality of filter configurations.

8. A method of signal processing according to claim 1, wherein the representation of the hand gesture is based on a sequence of images of a user performing the hand gesture within the sound field.

9. The method of signal processing according to claim 8, wherein said sequence of images includes images of a light pattern projected on a hand of the user.

10. A method of signal processing according to claim 1, wherein the hand gesture includes a lateral movement of a hand of a user.

11. A method of signal processing according to claim 1, wherein the hand gesture includes a grasping motion of a hand of a user.

12. A method of signal processing according to claim 1, wherein the hand gesture includes movement of two hands of a user toward each other.

13. A method of signal processing according to claim 1, wherein the hand gesture includes movement of two hands of a user away from each other.

14. A method of signal processing according to claim 1, wherein the hand gesture includes movement of two hands of a user in a same lateral direction.

15. An apparatus for signal processing, said apparatus comprising:
   means for producing a command in response to a representation of a hand gesture of a user, wherein the hand gesture indicates (i) a change to a sound field near the user and (ii) a direction of where to direct the sound field, wherein the sound field comprises a beam;
   means for producing a filter configuration for a spatially directive filter in response to said command based on a current filter configuration;
   means for applying the spatially directive filter to a multichannel signal; and
   means for driving an array of directionally controllable transducers with the multichannel signal to change the sound field that includes the beam.

16. The apparatus for signal processing according to claim 15, wherein said means for producing the command comprises means for selecting the command, based on information from said representation, from among a plurality of commands that includes (A) a command to increase a width of the beam and (B) a command to decrease the width of the beam.

17. An apparatus for signal processing according to claim 15, wherein said means for producing the command comprises means for selecting the command, based on information from said representation, from among a plurality of commands that includes (A) a command to change a current direction of the beam to a first direction that is on a first side of the beam and (B) a command to change the current direction of the beam to a second direction that is on a second side of the beam opposite to the first side.

18. An apparatus for signal processing according to claim 15, wherein said means for producing the filter configuration is configured to produce the filter configuration based on an indication of at least one among a current direction of the beam and a current width of the beam.

19. An apparatus for signal processing according to claim 15, wherein said means for producing the filter configuration is configured to produce the filter configuration based on an indication of a current location of a user.

20. An apparatus for signal processing according to claim 15, wherein said means for producing the filter configuration comprises means for selecting the filter configuration, according to said command, from among a plurality of filter configurations.

21. The apparatus for signal processing according to claim 20, wherein a first filter configuration among the plurality of filter configurations describes a different phase relation among output channels of the spatially directive filter than a second filter configuration among the plurality of filter configurations.

22. An apparatus for signal processing according to claim 15, wherein the representation of the hand gesture is based on a sequence of images of a user performing the hand gesture within a sound field.

23. The apparatus for signal processing according to claim 22, wherein said sequence of images includes images of a light pattern projected on a hand of the user.

24. An apparatus for signal processing according to claim 15, wherein the hand gesture includes a lateral movement of a hand of a user.

25. An apparatus for signal processing according to claim 15, wherein the hand gesture includes a grasping motion of a hand of a user.

26. An apparatus for signal processing according to claim 15, wherein the hand gesture includes movement of two hands of a user toward each other.

27. An apparatus for signal processing according to claim 15, wherein the hand gesture includes movement of two hands of a user away from each other.

28. An apparatus for signal processing according to claim 15, wherein the hand gesture includes movement of two hands of a user in a same lateral direction.

29. An apparatus for signal processing, said apparatus comprising:
a gesture interpreter configured to produce a command in response to a representation of a hand gesture of a user, wherein the hand gesture indicates (i) a change to a sound field near the user and (ii) a direction of where to direct the sound field, wherein the sound field comprises a beam;
a command interpreter configured to produce a filter configuration for a spatially directive filter in response to said command based on a current filter configuration;
a synthesizer configured to apply the spatially directive filter to a multichannel signal; and
an audio output stage configured to drive an array of directionally controllable transducers with the multichannel signal to change the sound field that includes the beam.

30. The apparatus according to claim 29, wherein said gesture interpreter is configured to produce the command by selecting the command, based on information from said representation, from among a plurality of commands that includes a command to increase a width of the beam and a command to decrease the width of the beam.

31. An apparatus according to claim 29, wherein said gesture interpreter is configured to produce the command by selecting the command, based on information from said representation, from among a plurality of commands that includes (A) a command to change a current direction of the beam to a first direction that is on a first side of the beam and (B) a command to change the current direction of the beam to a second direction that is on a second side of the beam opposite to the first side.

32. An apparatus according to claim 29, wherein said command interpreter is configured to produce the filter configuration based on an indication of at least one among a current direction of the beam and a current width of the beam.

33. An apparatus according to claim 29, wherein said command interpreter is configured to produce the filter configuration based on an indication of a current location of a user.

34. An apparatus according to claim 29, wherein said command interpreter is configured to produce the filter configuration by selecting the filter configuration, according to said command, from among a plurality of filter configurations.

35. The apparatus according to claim 34, wherein a first filter configuration among the plurality of filter configurations describes a different phase relation among output channels of the synthesizer than a second filter configuration among the plurality of filter configurations.

36. An apparatus according to claim 29, wherein said audio output stage is configured to drive the directionally controllable transducers to produce a sound field that includes the beam, and
wherein the representation of the hand gesture is based on a sequence of images of a user performing the hand gesture within the sound field.

37. The apparatus according to claim 36, wherein said sequence of images includes images of a light pattern projected on a hand of the user.

38. An apparatus according to claim 29, wherein the hand gesture includes a lateral movement of a hand of a user.

39. An apparatus according to claim 29, wherein the hand gesture includes a grasping motion of a hand of a user.

40. An apparatus according to claim 29, wherein the hand gesture includes movement of two hands of a user toward each other.

41. An apparatus according to claim 29, wherein the hand gesture includes movement of two hands of a user away from each other.

42. An apparatus according to claim 29, wherein the hand gesture includes movement of two hands of a user in a same lateral direction.

43. A non-transitory computer-readable medium having tangible features that cause a machine reading the features to:
produce a command in response to a representation of a hand gesture of a user, wherein the hand gesture indicates (i) a change to a sound field near the user and (ii) a direction of where to direct the sound field, wherein the sound field comprises a beam;

produce a filter configuration for a spatially directive filter in response to said command based on a current filter configuration;

apply the spatially directive filter to a multichannel signal; and drive an array of directionally controllable transducers with the multichannel signal to change the sound field that includes the beam.

44. The method according to claim 1, wherein the applying the spatially directive filter is based on the filter configuration.

45. The apparatus according to claim 15, wherein the means for applying the spatially directive filter is based on the filter configuration.

46. The apparatus according to claim 29, wherein the applying the spatially directive filter is based on the filter configuration.

47. The computer-readable medium according to claim 43, wherein the applying the spatially directive filter is based on the filter configuration.

48. The method of claim 1, further comprising detecting the hand gesture using a camera.

49. The apparatus of claim 29, further comprising a camera configured to detect the representation of the hand gesture.

50. The apparatus of claim 29, wherein the gesture interpreter and the synthesizer are integrated in a processor.

51. The apparatus of claim 29, further comprising the directionally controllable transducers.

52. The apparatus of claim 29, wherein the hand gesture indicates a change to a width of the beam.

53. The apparatus of claim 29, wherein the hand gesture indicates an amplification of the sound field.

54. The apparatus of claim 29, wherein the hand gesture indicates an attenuation of the sound field.

* * * * *